(12) United States Patent
Lu et al.

(10) Patent No.: US 10,450,069 B2
(45) Date of Patent: Oct. 22, 2019

(54) VEHICLE REFRIGERATION EQUIPMENT HAVING A LIQUID HEAT REJECTION SYSTEM

(71) Applicant: B/E AEROSPACE, INC., Wellington, FL (US)

(72) Inventors: Qiao Lu, Placentia, CA (US); William J. Godecker, Irvine, CA (US)

(73) Assignee: B/E Aerospace, Inc., Winston Salem, NC (US)

( * ) Notice: Subject to any disclaimer, the term of this patent is extended or adjusted under 35 U.S.C. 154(b) by 183 days.

(21) Appl. No.: 14/666,921

(22) Filed: Mar. 24, 2015

(65) Prior Publication Data
US 2015/0266353 A1   Sep. 24, 2015

Related U.S. Application Data

(60) Provisional application No. 61/969,770, filed on Mar. 24, 2014.

(51) Int. Cl.
*B64D 13/00* (2006.01)
*B64D 11/04* (2006.01)
(Continued)

(52) U.S. Cl.
CPC .......... *B64D 11/04* (2013.01); *B64D 11/0007* (2013.01); *B64D 13/08* (2013.01);
(Continued)

(58) Field of Classification Search
CPC ............................... B64D 11/04; B64D 13/08; B64D 2013/0674; B64D 2013/0629;
(Continued)

(56) References Cited

U.S. PATENT DOCUMENTS

| 3,199,579 A | 8/1965 | Foster et al. |
| 6,269,652 B1 * | 8/2001 | Grosskopf ......... B60H 1/00014 62/239 |

(Continued)

FOREIGN PATENT DOCUMENTS

| CA | 2753273 A1 | 9/2010 |
| DE | 19839050 C1 | 2/2000 |

(Continued)

OTHER PUBLICATIONS

International Search Report and Written Opinion of the ISA/US issued in related application PCT/US2015/022219, dated Jun. 18, 2015, 9 pages.

(Continued)

*Primary Examiner* — Frantz F Jules
*Assistant Examiner* — Martha Tadesse
(74) *Attorney, Agent, or Firm* — Suiter Swantz pc llo

(57) ABSTRACT

A refrigeration system includes an air chiller, a liquid coolant line that couples the air chiller with a central liquid coolant cooling system of a vehicle, a storage compartment stowage area having an interior for stowing a plurality of removable storage compartments, and a duct system that circulates chilled air from the air chiller through the storage compartment stowage area. The air chiller includes a compressor, a liquid-cooled condenser, an evaporator, and a tubing to circulate refrigerant. The liquid-cooled condenser transfers heat from the refrigerant to the liquid coolant which is then cooled by the central liquid coolant cooling system of the vehicle. The air chiller is situated parallel to the storage compartment stowage area along a plane perpendicular to a direction in which the removable storage compartments are removed and replaced. The duct system circulates chilled air from the evaporator through the interior of the storage compartment stowage area.

3 Claims, 15 Drawing Sheets

(51) Int. Cl.
  *B60H 1/32*  (2006.01)
  *B64D 13/08* (2006.01)
  *B64D 11/00* (2006.01)
  *B64D 13/06* (2006.01)

(52) U.S. Cl.
  CPC ............... *B64D 2013/0629* (2013.01); *B64D 2013/0674* (2013.01)

(58) Field of Classification Search
  CPC ............... B64D 13/06; B60H 1/00014; B60H 2001/00928; F25D 17/04; F25D 19/003; Y02T 50/56
  See application file for complete search history.

(56) References Cited

U.S. PATENT DOCUMENTS

| | | | |
|---|---|---|---|
| 7,231,778 B2 | 6/2007 | Rigney et al. | |
| 7,523,622 B2* | 4/2009 | Zywiak | B64D 11/04 62/244 |
| 8,721,409 B1* | 5/2014 | Morales | H05K 7/20209 454/184 |
| 9,238,398 B2 | 1/2016 | Lu et al. | |
| 2005/0092008 A1* | 5/2005 | Ozaki | B64D 11/04 62/285 |
| 2005/0210910 A1* | 9/2005 | Rigney | B60H 1/00014 62/407 |
| 2009/0301120 A1 | 12/2009 | Godecker et al. | |
| 2010/0071384 A1* | 3/2010 | Lu | B60H 1/00592 62/3.2 |
| 2010/0224726 A1* | 9/2010 | Lu | F25D 17/06 244/118.5 |
| 2012/0291459 A1* | 11/2012 | Millar | B64D 11/04 62/79 |
| 2013/0247600 A1 | 9/2013 | Lu et al. | |
| 2013/0269384 A1 | 10/2013 | Burd | |

FOREIGN PATENT DOCUMENTS

| | | |
|---|---|---|
| EP | 0982163 A2 | 3/2000 |
| EP | 1527995 A2 | 5/2005 |
| EP | 2228333 A1 | 9/2010 |
| EP | 2326894 B1 | 3/2013 |
| JP | S57157979 A | 9/1982 |
| JP | H0532985 U | 2/1993 |
| JP | H0656671 U | 3/1994 |
| JP | 2005134002 A | 5/2005 |
| JP | 2007537077 A | 12/2007 |
| JP | 2012503757 A | 2/2012 |
| JP | 2012519624 A | 8/2012 |
| JP | 2013511019 A | 3/2013 |
| JP | 2014525371 A | 9/2014 |
| JP | 2016531262 A | 10/2016 |
| WO | 2009149320 A1 | 12/2009 |
| WO | 2013142824 A1 | 9/2013 |
| WO | 2015003073 A1 | 1/2015 |

OTHER PUBLICATIONS

International Preliminary Report on Patentability dated Sep. 27, 2016 for PCT/US2015/022219.
Office Action dated Apr. 24, 2018 for CN Appln. No. 201580015768.9.
Office Action dated Apr. 24, 2018 for Chinese Patent Application No. 201580015768.9.
Search Report dated Oct. 10, 2017 for EP Application No. 15769982.8.

* cited by examiner

VEHICLE REFRIGERATION EQUIPMENT HAVING A LIQUID HEAT REJECTION SYSTEM

BACKGROUND

Embodiments relate to refrigeration equipment. More specifically, embodiments relate to vehicle refrigeration equipment having a liquid heat rejection system.

Conventional refrigeration units for chilling food and beverages used in vehicles such as aircraft and other galley food service systems include vapor cycle systems that use a fluid refrigerant to chill air for circulation in a compartment that stores food and beverages. In general, vapor cycle systems for refrigeration units are designed to maintain set temperatures as required for steady state heat loads. Typically, such conventional refrigeration units reject heat into air local to the refrigeration units via an air-cooled condenser.

SUMMARY

According to an embodiment, a refrigeration system for cooling removable storage compartments in a vehicle galley includes an air chiller, a liquid coolant line that couples the air chiller with a central liquid coolant cooling system of the vehicle, a storage compartment stowage area, and a duct system that circulates chilled air from the air chiller through the storage compartment stowage area. The air chiller includes a compressor, a liquid-cooled condenser, an evaporator, and a tubing to circulate refrigerant through the air chiller from the compressor to the liquid-cooled condenser to the evaporator and back to the compressor. The liquid coolant line circulates liquid coolant between the central liquid coolant cooling system of the vehicle that cools the liquid coolant and the liquid-cooled condenser that transfers heat from the refrigerant circulating through the tubing to the liquid coolant. The storage compartment stowage area has an interior for stowing a plurality of removable storage compartments. The duct system is in fluid communication between the storage compartment stowage area and the air chiller. The air chiller is situated parallel to the storage compartment stowage area along a plane perpendicular to a direction in which the removable storage compartments are removed and replaced. The duct system circulates chilled air from the evaporator through the interior of the storage compartment stowage area and returns return air from the interior of the storage compartment stowage area to the evaporator. The duct system does not include any ducts behind the removable storage compartments.

The air chiller may be situated to a side of the storage compartment stowage area.

The air chiller may output the chilled air at a lower portion of the air chiller, the chilled air may enter the storage compartment stowage area at a lower region of the storage compartment stowage area, the return air may exit the storage compartment stowage area at an upper region of the storage compartment stowage area, and the return air may enter the air chiller at an upper portion of the air chiller.

The air chiller may operate using three phase alternating current electrical power.

The air duct system may direct the chilled air to flow below the storage compartments and draw the return air from above the storage compartments in the storage compartment stowage area.

The air duct system may direct the chilled air to flow into the storage compartments and draw the return air from within the storage compartments in the storage compartment stowage area.

The air chiller may further comprise a fan that draws the chilled air downward from the evaporator disposed in an upper portion of the air chiller and outputs the chilled air downward through a chiller air outlet in a lower portion of the air chiller.

According to another embodiment, a method of cooling removable storage compartments in a vehicle galley, includes: circulating refrigerant through a tubing between a compressor, a liquid-cooled condenser, and an evaporator of an air chiller; circulating liquid coolant through a liquid coolant line between a central liquid coolant cooling system of a vehicle that cools the liquid coolant and the liquid-cooled condenser; transferring heat from the refrigerant circulating through the tubing to the liquid coolant circulating through the liquid coolant line; circulating air through a duct system between an evaporator of the air chiller and a storage compartment stowage area having an interior for stowing a plurality of removable storage compartments; and chilling the air by the evaporator of the air chiller. The air chiller is situated parallel to the storage compartment stowage area along a plane perpendicular to a direction in which the removable storage compartments are removed and replaced. The air does not circulate through any ducts behind the removable storage compartments relative to a front side of the storage compartment stowage area through which the removable storage compartments are removed and replaced.

The circulating air through the duct system may include circulating the air between the storage compartment stowage area and the evaporator of the air chiller, wherein the air chiller is situated to a side of the storage compartment stowage area.

The method may further include the air chiller outputting the chilled air at a lower portion of the air chiller, the chilled air entering the storage compartment stowage area at a lower region of the storage compartment stowage area, the return air exiting the storage compartment stowage area at an upper region of the storage compartment stowage area, and the return air entering the air chiller at an upper portion of the air chiller.

The method may further include operating the air chiller using three phase alternating current electrical power.

The method may further include directing the chilled air by the duct system to flow below the storage compartments and drawing the return air from above the storage compartments in the storage compartment stowage area by the duct system.

The method may further include directing the chilled air to flow into the storage compartments by the duct system and drawing the return air from within the storage compartments in the storage compartment stowage area by the duct system.

The method may further include drawing the chilled air downward from the evaporator disposed in an upper portion of the air chiller by a fan and outputting the chilled air downward through a chiller air outlet in a lower portion of the air chiller by the fan.

BRIEF DESCRIPTION OF THE DRAWINGS

Exemplary embodiments are shown in the attached drawings, briefly described below.

DETAILED DESCRIPTION

While the following embodiments are described with reference to refrigeration equipment for cooling compartments in an aircraft galley, this should not be construed as limiting. Embodiments may also be used for cooling compartments in other vehicles such as ships, buses, trucks, automobiles, trains, recreational vehicles, and spacecraft, or in terrestrial settings such as offices, stores, homes, cabins, etc. Embodiments may also include refrigerator compartments.

Figure 1:
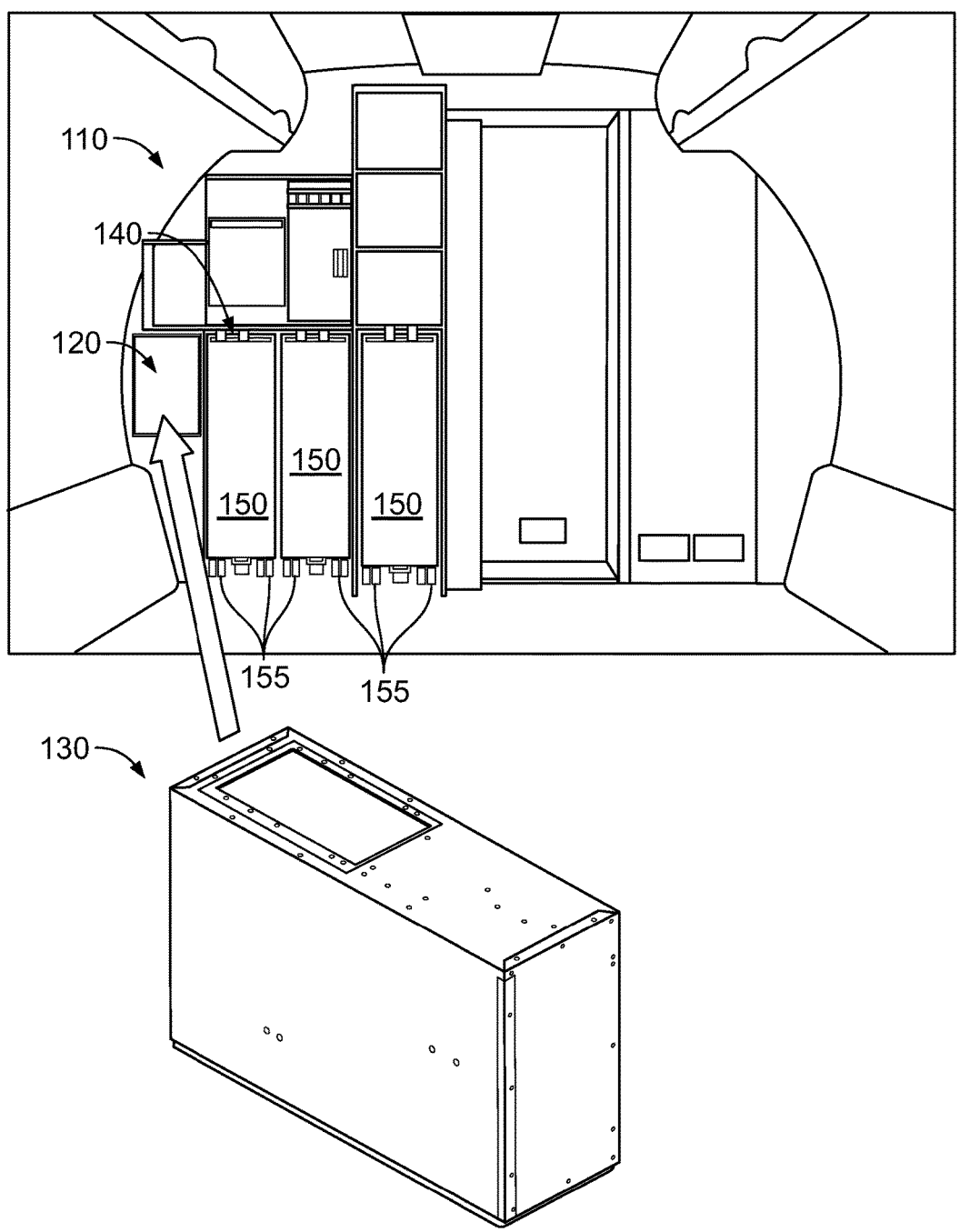
FIG. 1 is a diagrammatic view that illustrates a relative position of an air chiller in an aircraft galley including galley carts, according to an embodiment.

FIG. 1 is a diagrammatic view that illustrates a relative position of an air chiller 130 in an aircraft galley 110 including galley carts 150, according to an embodiment. The air chiller 130 is positioned in an air chiller mounting location 120 adjacent to and to the left of a galley cart stowage area 140. This should not be construed as limiting, as in alternative embodiments, the air chiller mounting location 120 may be to the right of, above, or below the galley cart stowage area 140. The air chiller mounting location 120 may be configured so that the air chiller 130 is situated parallel to the galley cart stowage area 140 along a plane perpendicular to the direction in which the galley carts 150 are removed from and replaced in the galley cart stowage area 140.

The galley carts 150 may be disposed on wheels 155, and may be rolled in and out of the galley cart stowage area 140 for removal from and replacement into the galley cart stowage area 140 from a front side of the galley cart stowage area 140. Each of the galley carts 150 may include a storage compartment. The galley cart stowage area 140 may therefor also be referred to as a storage compartment stowage area. The storage compartment may be configured for storing food and/or beverages at temperatures other than ambient temperatures, for example, either hot or cold temperatures. The storage compartment may be insulated to better maintain a temperature inside. The storage compartment may be accessible from at least one of the front and back of the galley cart 150.

The air chiller 130 may be coupled with air ducts to circulate chilled air through and/or around the galley carts 150 in the galley cart stowage area 140. The air ducts may be disposed in and/or between the air chiller mounting location 120 and the galley cart stowage area 140. The air ducts may be disposed along one or more of the sides, top, or bottom of the galley cart stowage area 140, and may not be disposed along a back side of the galley cart stowage area 140. The configuration of the air ducts may thus save space behind the galley carts 150, facilitating deeper galley carts 150 for more storage capacity within their storage compartments, or a reduction in the depth of the galley cart stowage area 140 for space savings onboard the aircraft.

The air chiller 130 may include an air-fluid heat exchanger, or evaporator, that removes heat from air circulating through or around the galley carts 150 in the galley cart stowage area 140 using circulating refrigerant of a vapor cycle system. The air chiller 130 may also include a liquid heat rejection system by which heat transferred from the galley cart stowage area 140 and the galley carts 150 by the air-fluid heat exchanger into the circulating refrigerant is rejected through a liquid-cooled condenser into liquid coolant circulating through a liquid coolant system onboard the aircraft. The circulating liquid coolant may not be compressed by a compressor as part of a vapor cycle system, but may remain in a liquid phase throughout its circulation through the aircraft.

As illustrated, the air chiller 130 may include an evaporator that inputs warm return air from the galley cart stowage area 140 and/or galley carts 150 from a top or upper region or portion of the air chiller 130, chills the air using an evaporator, and outputs chilled air through the bottom or lower region or portion of the air chiller 130 for circulation to the galley cart stowage area 140 and/or galley carts 150. A lower region or portion of the air chiller 130 may be considered to be a region or portion of the air chiller 130 which is lower than a vertical midpoint, whereas an upper region or portion of the air chiller 130 may be considered to be a region or portion of the air chiller 130 which is above a vertical midpoint. Embodiments configured as illustrated may not require air ducting behind the rear of the aircraft galley 110 or behind the galley cart stowage area 140 or galley carts 150. Therefore, embodiments as illustrated may save space in an aircraft galley 110, which may facilitate the space to be more profitably utilized for cabin seating area onboard a passenger aircraft. In addition, because the heat is rejected through the liquid coolant system instead of via air exhausted from the air chiller 130, the environment of the aircraft galley 110 may not be excessively heated by warm air exhausted from air chillers and may be quieter than if warm air was exhausted from air chillers as in typical aircraft galleys.

In an embodiment, the air chiller 130 including the liquid heat rejection system may have a cooling capacity of about 4,000 BTU/hour. A return air temperature may be about 4 degrees centigrade. The air chiller 130 may operate using a nominal 115 volt AC, 3 phase, 400 Hz power supply. These performance figures and power supply characteristics should not be construed as limiting, as in various embodiments, the air chiller 130 may exhibit different performance figures and may operate using different power supply characteristics.

Figure 2:
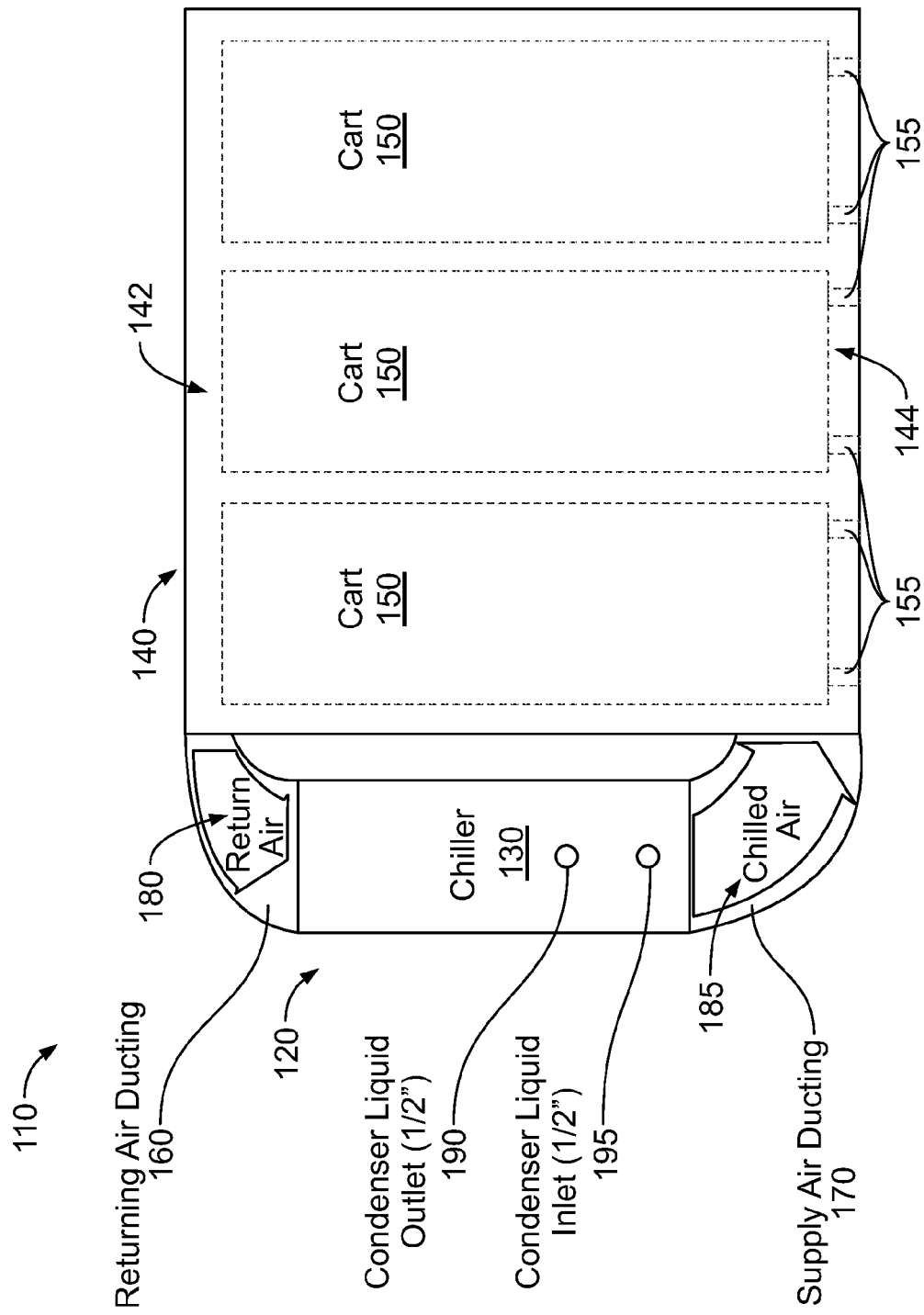
FIG. 2 is a schematic view that illustrates a relative position of an air chiller in an aircraft galley including galley carts, according to an embodiment.

FIG. 2 is a schematic view that illustrates a relative position of an air chiller 130 in an aircraft galley 110 including galley carts 150, according to an embodiment. As illustrated, the air chiller 130 receives warmed return air 180 from the galley cart stowage area 140 and/or galley carts 150 through return air ducting 160. The return air ducting 160 may be coupled with and in fluid communication with an upper region 142 of the galley cart stowage area 140. The supply air ducting 170 may be coupled with and in fluid communication with a lower region 144 of the galley cart stowage area 140. The lower region 144 may be considered to be a region of the galley cart stowage area 140 that is lower than a vertical midpoint of the galley cart stowage area 140, and the upper region 142 of the galley cart stowage area 140 may be considered to be a region of the galley cart stowage area 140 that is higher than a vertical midpoint of the galley cart stowage area 140. The upper region 142 may include a region above the top of the galley carts 150, and the lower region 144 may include a region below the bottom of the galley carts 150. The return air ducting 160 and the supply air ducting 170 may be coupled with an enclosure of the air chiller 130 and optionally additional ducts to cause air to flow from the galley cart stowage area 140 and/or galley carts 150 through the return air ducting 160, to flow through an evaporator of the air chiller 130, to be chilled by the evaporator of the air chiller 130, and then to flow from the air chiller 130 through the supply air ducting 170 to the galley cart stowage area 140 and/or galley carts 150.

The galley carts 150 may include food storage compartments, and may be cooled in an air-over configuration or an air-through configuration. Food and/or beverages stored in the food storage compartments may be cooled by chilled air from the air chiller 130. In the air-over configuration, chilled air 185 from the air chiller 130 is routed by supply air ducting 170 between the air chiller mounting location 120 and the galley cart stowage area 140 to pass over or around an exterior of the food storage compartments and/or galley carts 150. In the air-through configuration, chilled air 185 from the air chiller 130 is routed to pass through the interior of the food storage compartments via the supply air ducting 170 and/or ducts in fluid communication with the supply air ducting 170 and the return air ducting 160. The return air ducting 160 may draw the return air 180 from the upper region 142 of the galley cart stowage area 140 or from an interior of each of the galley carts 150 and within the storage compartments therein via ducts in fluid communication with the return air ducting 160.

In various embodiments, ducts may route the chilled air 185 directly into an interior of each of the galley carts 150 via a vent in the bottom or lower region or portion of the galley carts 150, and ducts may route the return air 180 directly from the interior of each of the galley carts 150 via a vent in the top or upper region or portion of the galley carts 150. A lower region or portion of the galley carts 150 may be considered to be a region or portion of the galley carts 150 which is lower than a vertical midpoint, whereas an upper region or portion of the galley carts 150 may be considered to be a region or portion of the galley carts 150 which is above a vertical midpoint. In other embodiments, ducts may route the chilled air 185 into the interior of the galley cart stowage area 140 and indirectly into the interior of each of the galley carts 150 via a vent in the bottom or lower region or portion of the galley carts 150, and ducts may route the return air 180 from the interior of the galley cart stowage area 140 and indirectly from the interior of each of the galley carts 150 via a vent in the top or upper region or portion of the galley carts 150. In still other embodiments, ducts may route the chilled air 185 into the interior of the galley cart stowage area 140 to flow around an outside of the galley carts 150 and/or storage compartments within the galley carts 150, and ducts may route the return air 180 from the interior of the galley cart stowage area 140 after flowing around the outside of each of the galley carts 150 and/or storage compartments within the galley carts 150. The galley carts 150 and/or storage compartments within the galley carts 150 may include heat conductive surfaces to transfer heat from within the storage compartments into the air that flows around the galley carts 150 and/or storage compartments within the galley carts 150.

The air chiller 130 includes a vapor cycle system including a liquid-cooled condenser. The condenser may be operative to condense fluid refrigerant in a vapor cycle system of the air chiller 130 from a vapor state to a liquid state. The liquid-cooled condenser receives liquid coolant through a condenser liquid inlet 195, rejects heat from the refrigerant of the vapor cycle system into the liquid coolant, and then outputs the warmed liquid coolant through the condenser liquid outlet 190. The condenser liquid outlet 190 and the condenser liquid inlet 195 may include ½ inch connections, and may connect to a liquid cooling system of the aircraft which circulates liquid coolant through the aircraft to cool various equipment in multiple different galleys and/or other locations. The liquid coolant of the liquid cooling system may be cooled in a central location, for example, by a centrally located vapor cycle system. The liquid coolant may include propylene glycol (PGW), GALDEN® heat transfer fluid, or other fluid useful for transferring heat as known in the art.

Figure 3:
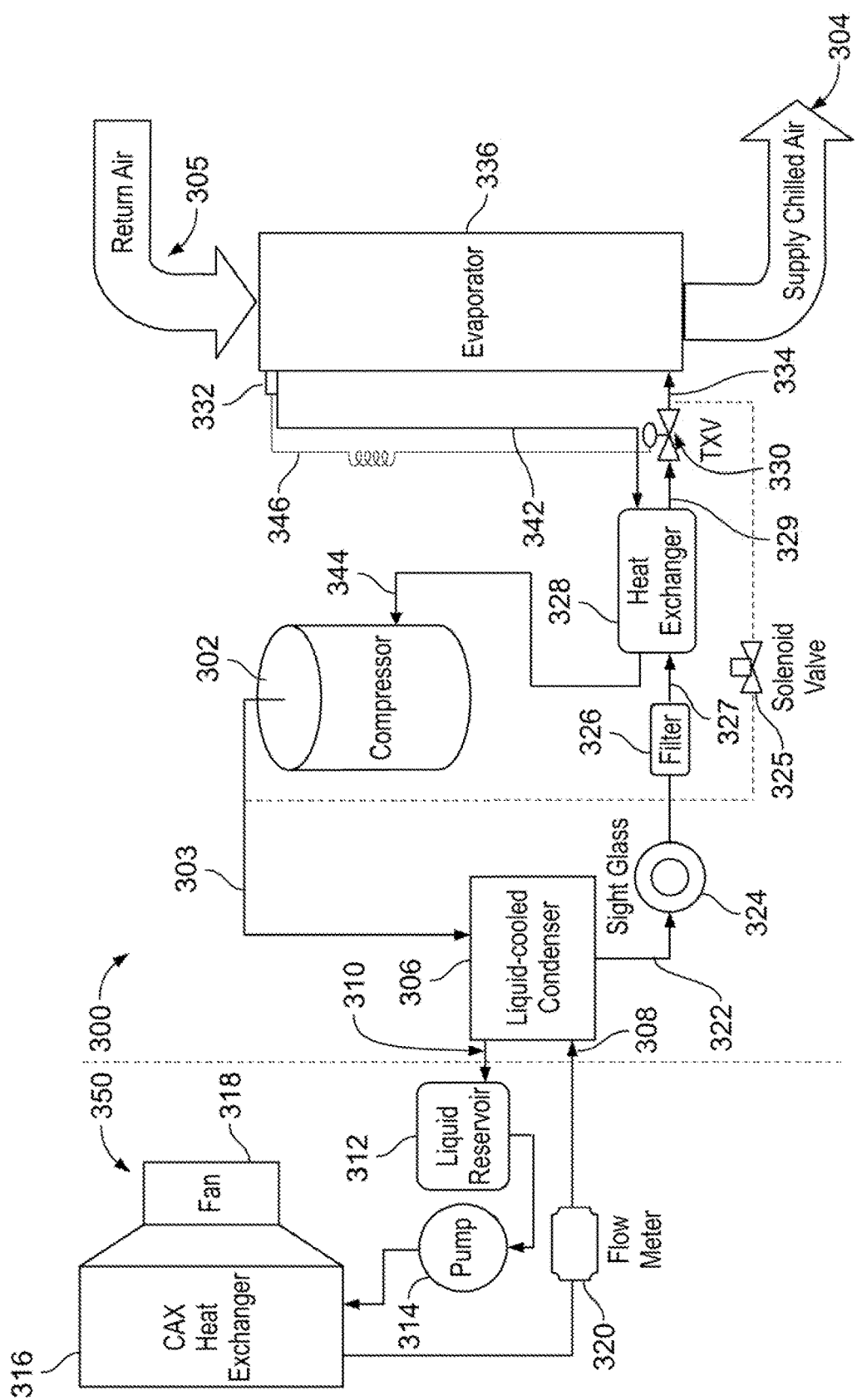
FIG. 3 is a schematic diagram of a vapor cycle refrigeration system, according to an embodiment.

FIG. 3 is a schematic diagram of a vapor cycle refrigeration system 300, according to an embodiment. The vapor cycle refrigeration system 300 may be an embodiment of the vapor cycle system included in the chiller 130. The vapor cycle system of the vapor cycle refrigeration system 300 includes a refrigerant circulation loop that includes a compressor 302, a liquid-cooled condenser 306, an expansion valve (TXV) 330, an evaporator 336, and a refrigerant heat exchanger 328. In addition, the vapor cycle refrigeration system 300 includes a sight glass 324 and a refrigerant filter 326 in the refrigerant circulation loop between the liquid-cooled condenser 306 and the expansion valve 330.

The compressor 302, condenser 306, sight glass 324, filter 326, expansion valve 330, evaporator 336, and refrigerant heat exchanger 328 are connected by refrigerant tubing that contains refrigerant and facilitates the refrigerant moving between the vapor cycle system components over the course of the refrigeration cycle. The refrigerant is preferably one of R-134a, R404A, R236fa, and R1234yf, but may be any suitable refrigerant for a vapor cycle system known or developed in the art.

In the vapor cycle refrigeration system 300, refrigerant is compressed by the compressor 302. The compressor 302 may compress refrigerant from a low-temperature, low-pressure vapor state into a high-temperature, high-pressure vapor. As refrigerant in vapor form is compressed in the compressor 302, the temperature and pressure of the refrigerant rise significantly such that the refrigerant may condense at ambient temperatures. Upon exiting the compressor 302, the refrigerant, in superheated vapor form, moves through refrigerant tubing 303 toward the liquid-cooled condenser 306. Within the condenser 306, heat from the refrigerant is rejected into a liquid coolant (e.g., propylene glycol/water (PGW)) and the refrigerant is condensed into a high pressure saturated liquid, and then further cooled to a sub-cooled liquid.

The liquid-cooled condenser 306 receives the liquid coolant via a liquid inlet 308, which may be an embodiment of the condenser liquid inlet 195 of FIG. 2. The liquid-cooled condenser 306 outputs warmed liquid coolant via a liquid outlet 310, which may be an embodiment of the condenser liquid outlet 190 of FIG. 2. The liquid coolant may then pass through a liquid reservoir 312 which holds a reserve of the liquid coolant. A pump 314 pumps the liquid coolant from the liquid reservoir 312 into a CAX heat exchanger 316 which cools the liquid coolant using airflow from a fan 318. After being cooled, the liquid coolant passes from the CAX heat exchanger 316 to a flow meter 320 that measures a flow rate of the liquid coolant before returning the liquid coolant to the liquid cooled condenser 306 via the liquid inlet 308.

In some embodiments, air from a central air conditioning system of the aircraft cools the liquid coolant using the CAX heat exchanger 316 via the fan 318. In other embodiments, air from exterior to the aircraft cools the liquid coolant using the CAX heat exchanger 316 via the fan 318. The liquid coolant may be cooled using other cooling systems as known in the art, for example, a vapor cycle system, in various embodiments.

The condenser 306 outputs the high pressure sub-cooled liquid refrigerant to refrigerant tubing 322, which then passes through the sight glass 324 and the filter 326. The filter 326 may remove any moisture and solid contaminants from the refrigerant. The filtered high pressure saturated liquid refrigerant then passes via tubing 327 to the heat exchanger 328. The heat exchanger 328 performs sub-cooling on the refrigerant in which heat is exchanged between the refrigerant liquid passing from the condenser 306 to the expansion valve 330 and the refrigerant vapor passing from the evaporator 336 to the compressor 302. In particular, the heat exchanger 328 performs a refrigerant liquid sub-cooling and refrigerant vapor superheating process by which the refrigerant passing from the filter 326 to the expansion valve 330 via the heat exchanger 328 transfers heat to the refrigerant passing from the evaporator 336 to the compressor 302 via the heat exchanger 328. By superheating the refrigerant before entering the compressor 302, droplets may be prevented from entering the compressor 302. The refrigerant vapor from the evaporator 336 enters the heat exchanger via tubing 342 and travels to the compressor 302 via tubing 344. The refrigerant liquid from the condenser 306 enters the heat exchanger 328 via tubing 327 and then enters the expansion valve 330 via tubing 329.

After being supercooled by the heat exchanger 328, the refrigerant originating from the condenser 306 passes through the expansion valve 330. The expansion valve 330 drops the pressure of the refrigerant to a pressure corresponding to a user-selected operating state and temperature set-point of the vapor cycle refrigeration system 300. The expansion valve 330 also causes a sudden decrease in pressure of the liquid refrigerant, thereby causing flash evaporation of a portion of the liquid refrigerant. The expansion valve 330 may include, for example, a block-type expansion valve with an internal sensing bulb. The expansion valve 330 may also be coupled with a thermal expansion remote bulb 332. The remote bulb 332 may be coupled with the expansion valve 330 by a capillary tube 346 that communicates a working gas between the expansion valve 330 and the remote bulb 332 for sensing a temperature of the refrigerant leaving the evaporator 336. Thus, the expansion valve 330 may serve as a thermostatic expansion valve and operate to control a flow of refrigerant into the evaporator 336 according to the temperature of the refrigerant leaving the evaporator 336. After the cold liquid/vapor mixture exits the expansion valve 330, the refrigerant moves through refrigerant tubing 334 and enters the evaporator 336.

As the low temperature and low pressure refrigerant moves through the evaporator 336, the refrigerant absorbs heat from the evaporator and lowers the temperature of evaporator fins of the evaporator 336 which then cool the air that circulate past the fins due to the operation of an evaporator fan. The cooled air circulated by the evaporator fan becomes the supply chilled air 304 that chills the galley cart stowage area 140 and/or galley carts 150 with which the vapor cycle refrigeration system 300 (e.g., air chiller 130 of FIGS. 1 and 2) is coupled. The supply chilled air 304 may be an embodiment of the chilled air 185 in FIG. 2. Warmed air may exit the interior of the galley cart stowage area 140 and/or galley carts 150 as return air 305 and the evaporator fan then circulates the return air 305 through the evaporator fins of the evaporator 336 to be cooled and once again become supply chilled air 304. The return air 305 may be an embodiment of the return air 180 of FIG. 2. As illustrated in FIGS. 1 and 2, the evaporator 336 is preferably located adjacent the destination for the supply chilled air 304 exiting the evaporator 336 such that the supply air ducting 170 and the return air ducting 160 may efficiently route the supply chilled air 304 to the destination and route the return air 305 back from the destination.

The transfer of thermal energy between the return air 305 circulating past the evaporator fins and the refrigerant flowing within the evaporator 336 converts the liquid refrigerant to vapor, which is then compressed by the compressor 302 as the vapor cycle system continues operation.

When the warm return air 305 passes over the cold surfaces of the evaporator 336, moisture in the air condenses on the evaporator fins in the form of condensate. This condensate may be drained from the vapor cycle refrigeration system 300 by a condensate drain and discarded.

When the vapor cycle refrigeration system 300 is placed in a defrost mode, a hot gas defrost valve 325 may be controlled to selectively route at least a portion of the hot vapor refrigerant directly from the output of the compressor 302 into an inlet of the evaporator 336 at the refrigerant tubing 334 in order to defrost the evaporator fins of the evaporator 336. The hot gas defrost valve 325 may include a solenoid-controlled valve.

The vapor cycle refrigeration system 300 includes a plurality of motors, sensors, and valve actuators in communication with a controller. Motors and associated electrical current sensors may include a fan motor that turns the evaporator fan, a fan current sensor that measures an electrical current of the fan motor for the evaporator fan, a compressor motor that drives the compressor 302, a compressor current sensor that measures an electrical current of the compressor motor that drives the compressor 302, a pump motor that operates the pump 314, a fan motor that turns the fan 318, a fan current sensor that measures an electrical current of the fan motor for the fan 318, the flow meter 320, the expansion valve 330, and the hot gas defrost valve 325.

Temperature sensors may include sensors that monitor temperatures of airflow through the vapor cycle refrigeration system 300 in various locations. The temperature sensors may include a thermistor, a thermocouple, or any suitable device known in the art for measuring and reporting temperature. The temperature sensors of the vapor cycle refrigeration system 300 may include, but are not limited to, a supply air temperature sensor that measures a temperature of the supply chilled air 304, and a return air temperature sensor that measures a temperature of the return air 305.

Another set of sensors may monitor temperature and/or pressures of refrigerant circulating through the vapor cycle refrigeration system 300. The pressure sensors may include a pressure transducer, a pressure switch, or any suitable device known in the art for sensing fluid pressure. The pressure sensors of the vapor cycle refrigeration system 300 may include a low side pressure switch and a low side pressure transducer that sense pressure of the refrigerant at an input to the compressor 302, a high side pressure transducer that senses pressure of the refrigerant at an output of the compressor 302, and a high side pressure switch that senses pressure of the refrigerant at an output of the condenser 306. In an embodiment, the low side pressure switch may turn off the vapor cycle refrigeration system 300 when the low side refrigerant pressure is below 10 psig, and the high side pressure switch may turn off the vapor cycle refrigeration system 300 when the high side refrigerant pressure is above 325 psig.

Using a liquid-cooled condenser 306 instead of an air-cooled condenser in conjunction with a condenser fan and condenser fan motor has a number of advantages. First, there is no need to include ducting for an air inlet and air exhaust for air to circulate to cool the condenser. This saves space in the limited-space environment of an aircraft galley. In addition, this prevents undesirable heat from the condenser being routed into the environment of the galley. Furthermore, during start-up of the vapor cycle refrigeration system 300, particularly in high ambient temperature conditions, the evaporator 336 will be warm. The start-up of the evaporator fan motor relative to the start-up of the pump 314 to circulate liquid coolant through the condenser 306 may therefore be delayed to prevent recirculation of warm air to the galley cart stowage area 140 and/or galley carts 150. Meanwhile the pump 314 and fan 318 will run in order to provide cooling to the condenser 306. When the compressor 302 is not operating, the evaporator fan motor may be turned off while the pump 314 and fan 318 continue to operate and the hot vapor and warm liquid refrigerant migrates back to the evaporator 336 due to the pressure difference between the condenser 306 and evaporator 336. In this way, warm air will not be blown from the evaporator into the areas intended to be chilled. Thus, the performance of the vapor cycle refrigeration system 300 may be optimized by independently adjusting and controlling air flow through the evaporator 336 while the condenser is separately cooled using the liquid cooling system 350.

FIGS. 4A, 4B, 4C, 4D, and 4E are perspective views of an air chiller, illustrating the relative positions and interconnections of components thereof, according to an embodiment. The air chiller 400 may be an embodiment of the air chiller 130, and may include an embodiment of the vapor cycle refrigeration system 300.

The air chiller 400 includes a chiller air inlet 402 in the enclosure top surface 404. In other embodiments, the chiller air inlet 402 may be in an upper region or portion of the air chiller 400 substantially closer to the top surface 404 than a bottom surface of the air chiller 400. The chiller air inlet 402 may include an air filter and attachment device (not shown). The enclosure of the air chiller 400 may be grounded to provide a Faraday shield to help shield the air chiller 400 from external electromagnetic interference (EMI) influences while containing internally generated high-frequency energy. Various embodiments of the air chiller 400 may also include an EMI filter to reduce susceptibility to conducted EMI and emissions of EMI.

A side enclosure panel 408 encloses the air chiller 400 on a side adjacent the chiller air inlet 402, while a side enclosure panel 406 encloses the air chiller 400 on an opposite side. A front enclosure panel 410 encloses the air chiller 400 on a front side as viewed in the drawings. An evaporator housing 412 receives return air (e.g., as return air 305 of FIG. 3) through the chiller air inlet 402. An evaporator fan 418 causes air to circulate from the chiller air inlet 402 through an evaporator 434 in the evaporator housing 412 and out (e.g., as supply chilled air 304 of FIG. 3) through a chiller air outlet 428 and chiller air outlet opening 432 in a bottom enclosure panel 430 on the bottom surface of the air chiller 400. The evaporator 434 may be an embodiment of the evaporator 336 of FIG. 3. The evaporator fan 418 is driven by an evaporator fan motor.

A refrigeration unit housing 414 is situated between an evaporator fan shroud 416 and the evaporator housing 412. The refrigeration unit housing 414 houses the thermostatic expansion valve 436, several refrigeration tubing segments, and connections to a refrigerant return connection 438 that returns refrigerant to a compressor 422, a refrigerant supply connection 440 that supplies refrigerant to the evaporator 434, and a refrigerant hot gas connection 442 that provides hot gas to defrost the evaporator 434. The compressor 422 may be an embodiment of the compressor 302 of FIG. 3. The thermostatic expansion valve 436 may be an embodiment of the expansion valve 330 of FIG. 3. The evaporator 434 receives fluid refrigerant from a liquid-cooled condenser 426 and uses the fluid refrigerant to chill air pulled through the evaporator 434 by an evaporator fan 418 including fan blades 444 via an evaporator fan shroud 416 and out the chiller air outlet 428. The liquid-cooled condenser 426 may be an embodiment of the liquid-cooled condenser 306 of FIG. 3, and may have a liquid inlet 450 and a liquid outlet 452 which are embodiments of the liquid inlet 308 and liquid outlet 310 of FIG. 3. Once the fluid refrigerant exits the evaporator 434, the fluid refrigerant returns to the compressor 422 to be compressed again and continue flowing through the vapor cycle system. Between the evaporator 434 and the compressor 422, the refrigerant may pass through an embodiment of the heat exchanger 328 coupled between the evaporator 434, the compressor 422, the thermostatic expansion valve 436, and a filter and dryer 510 (FIG. 5A) in a manner similar to that illustrated in and described with reference to FIG. 3. The compressed refrigerant passes through refrigerant tubing 420 from the compressor 422 to the liquid-cooled condenser 426. The refrigerant tubing 420 may be an embodiment of the refrigerant tubing 303 of FIG. 3.

Figure 4A:
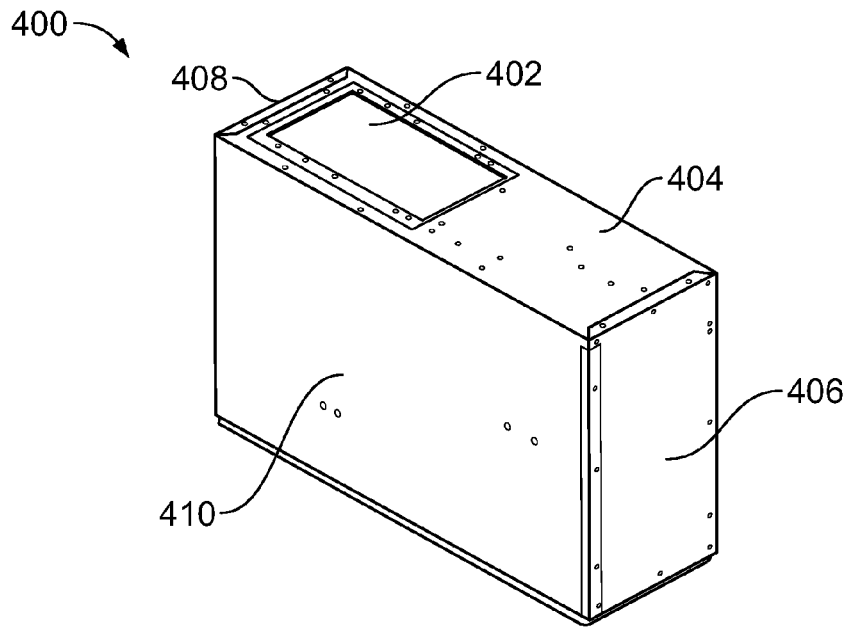
FIGS. 4A, 4B, 4C, 4D, and 4E are perspective views of an air chiller, illustrating the relative positions and interconnections of components thereof, according to an embodiment.
Figure 4B:
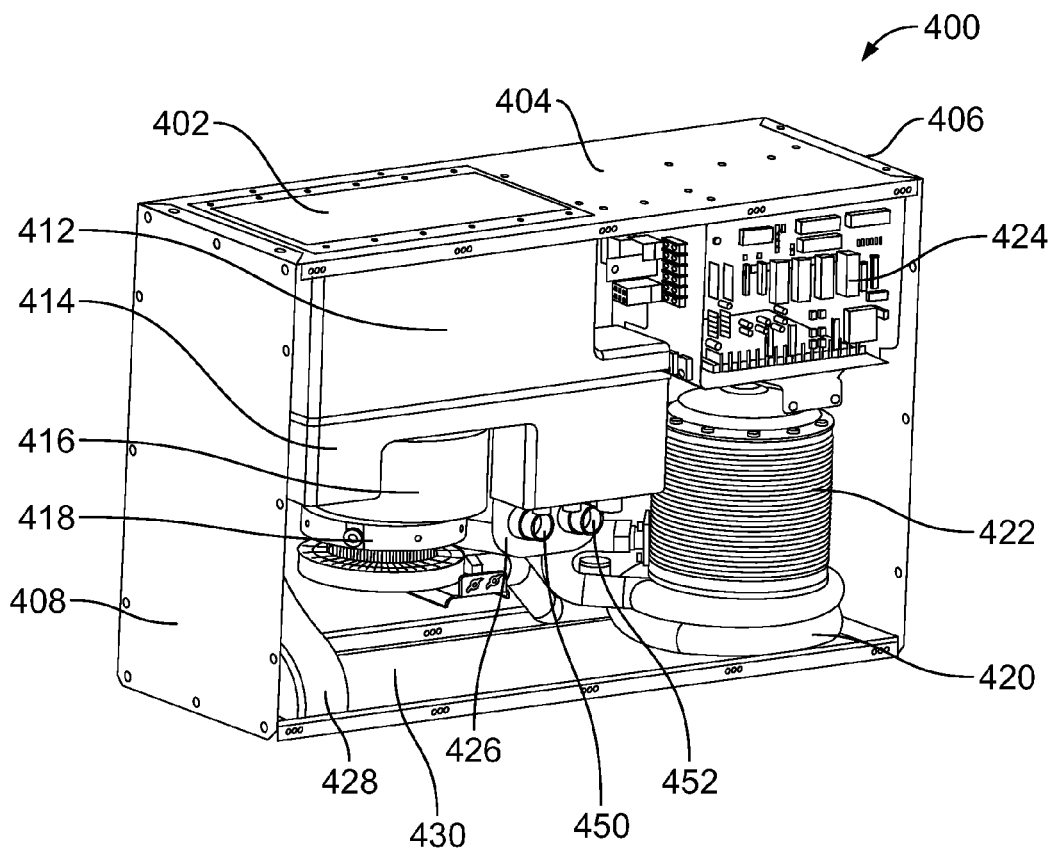
Figure 4C:
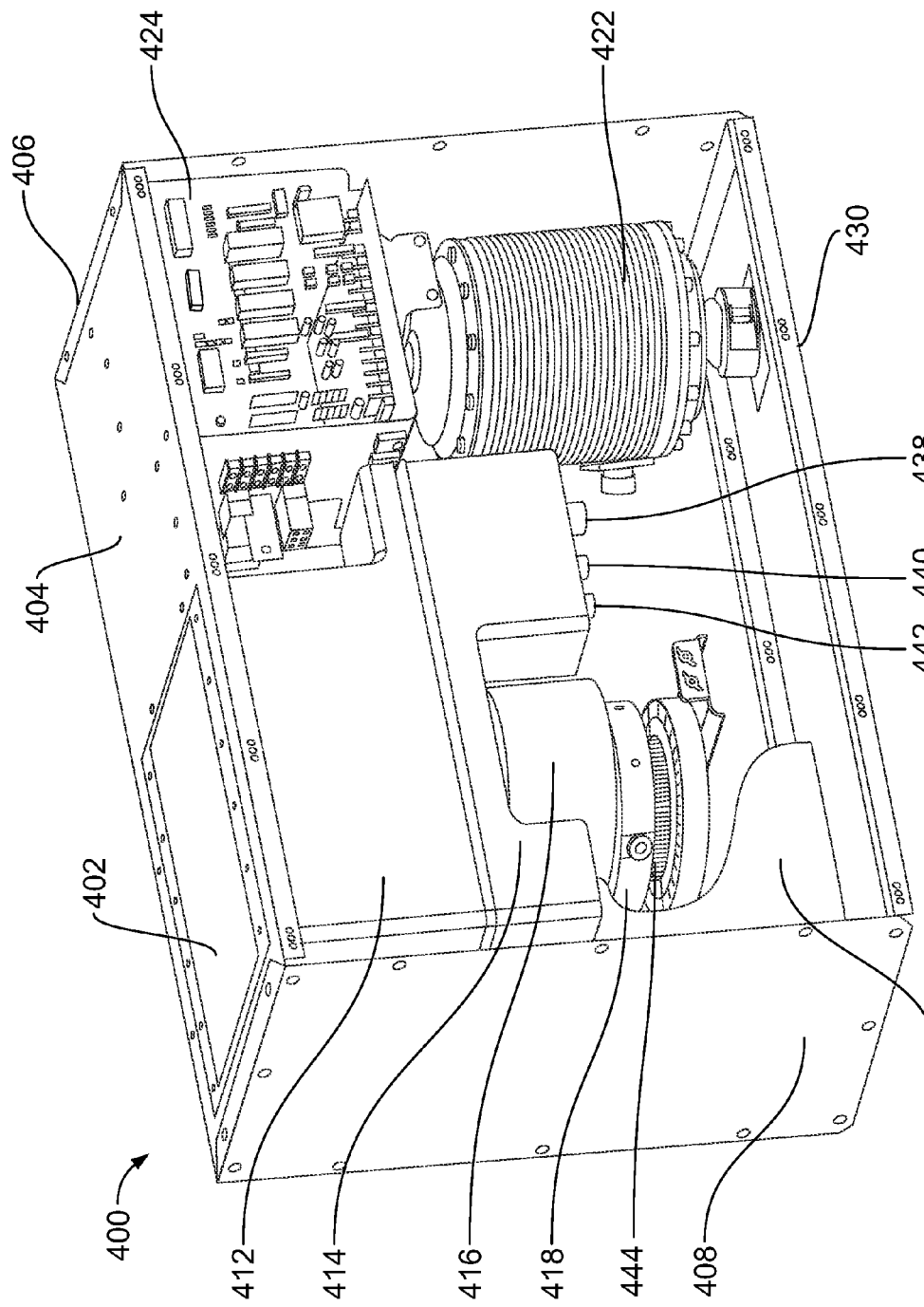
Figure 4D:
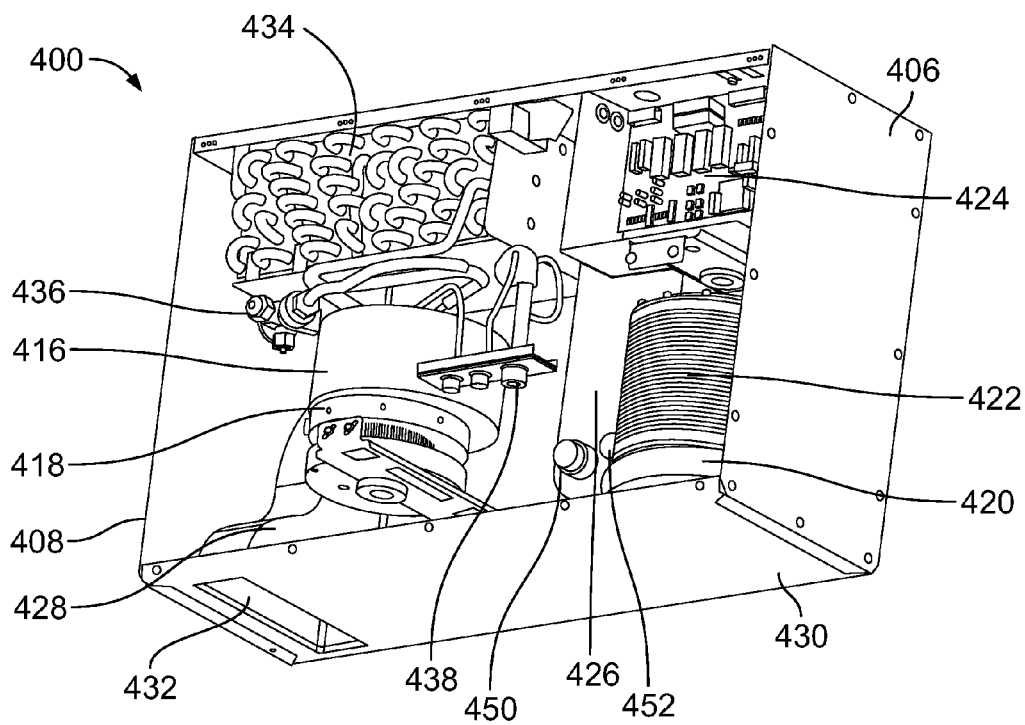
Figure 4E:
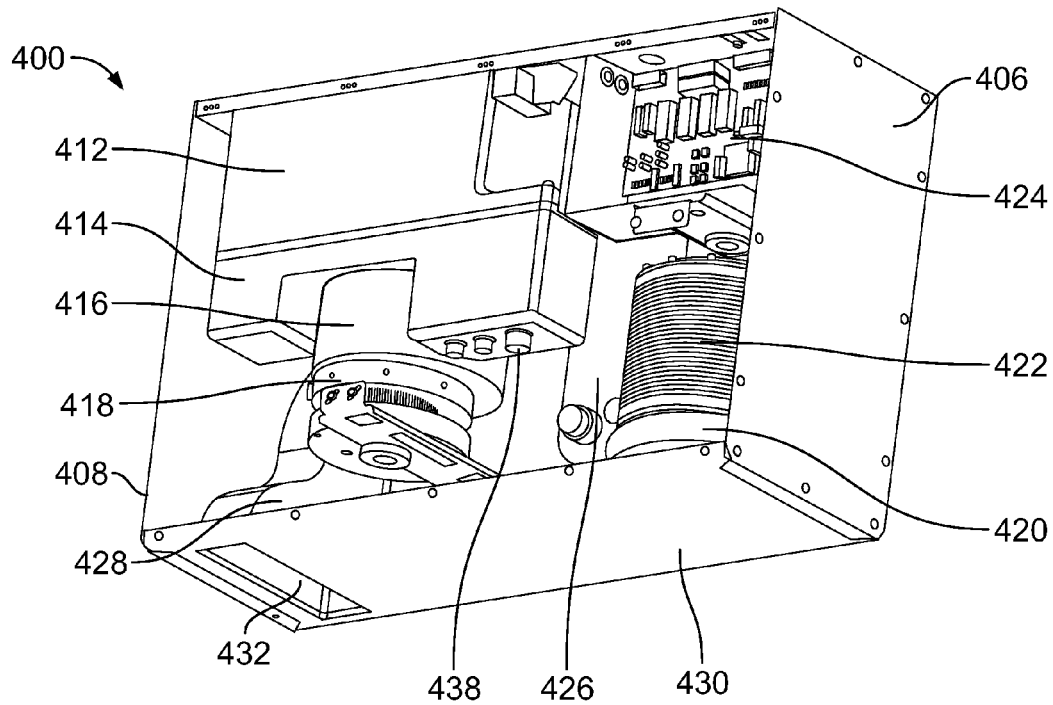

The chiller air outlet 428 and outlet opening 432 are shown in an orientation parallel with and adjacent to the side enclosure panel 408 in FIGS. 4B and 4D, while alternatively in an orientation parallel with and adjacent to the back enclosure panel opposite the front enclosure panel 410. By positioning the chiller air outlet 428 on a bottom or lower region or portion of the air chiller 400, the pressure drop in the aircraft galley air re-circulating system that circulates air through the galley cart stowage area 140 and/or galley carts 150 may be reduced.

Figure 5A:
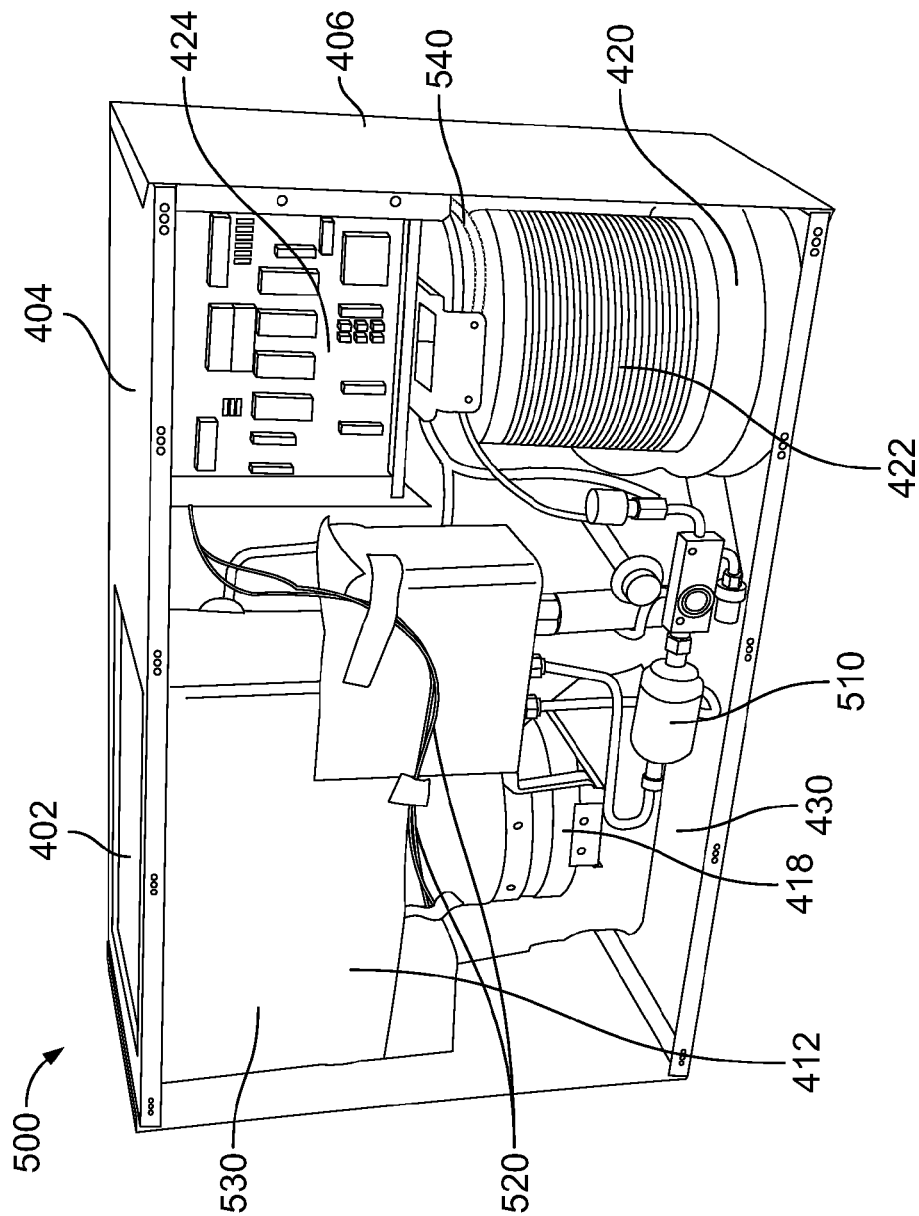
FIGS. 5A, 5B, 5C, 5D, 5E, 5F, and 5G are perspective views of an air chiller, illustrating the relative positions and interconnections of components thereof, according to another embodiment.
Figure 5B:
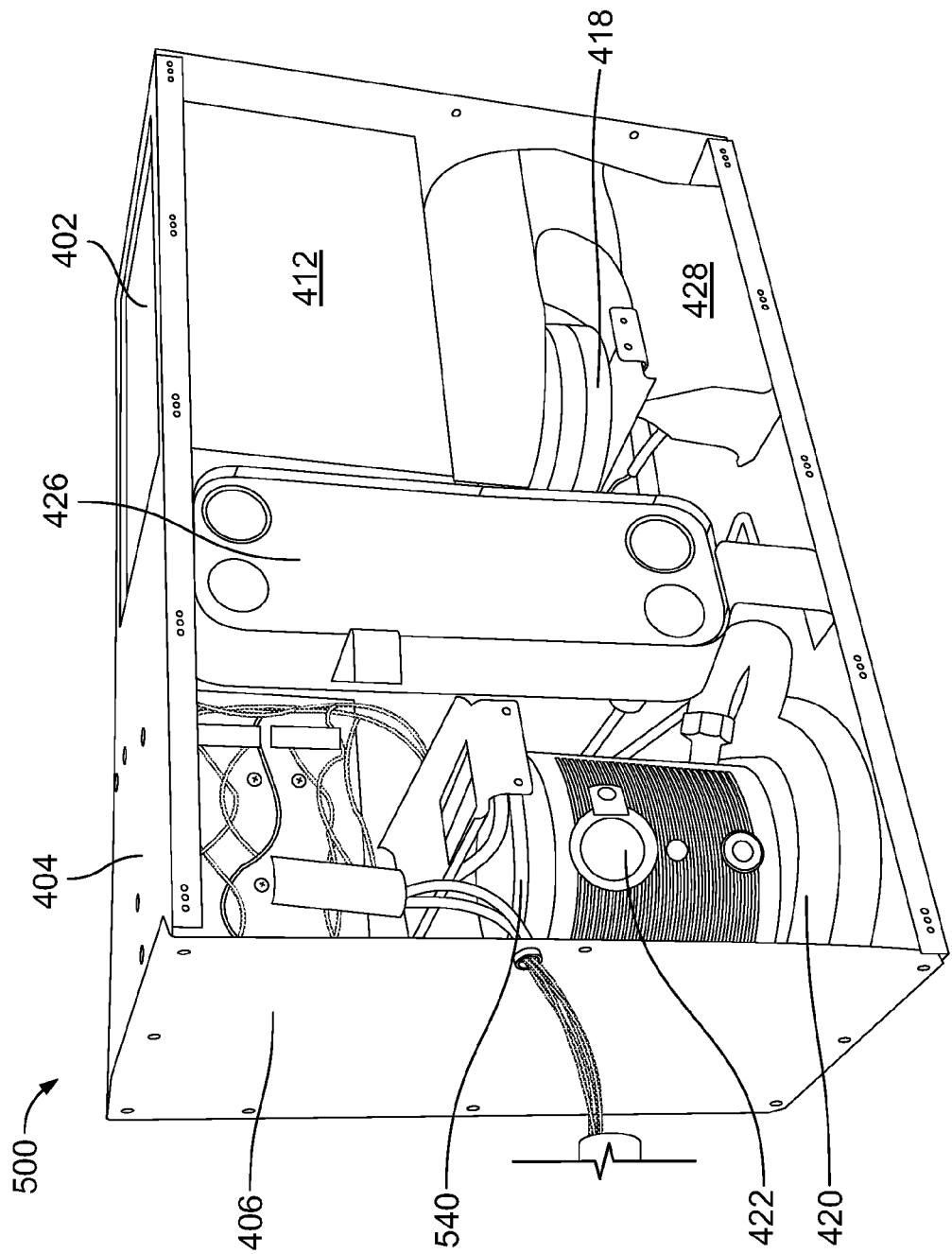
Figure 5C:
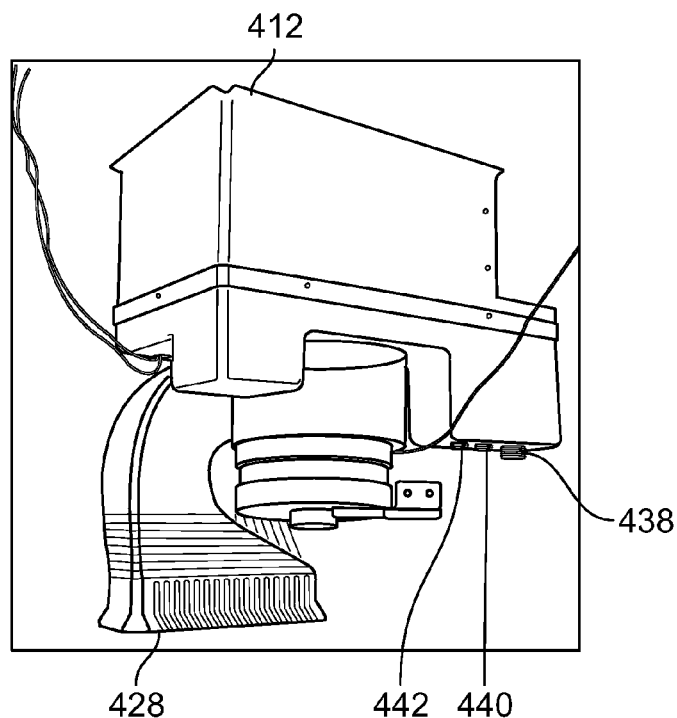
Figure 5D:
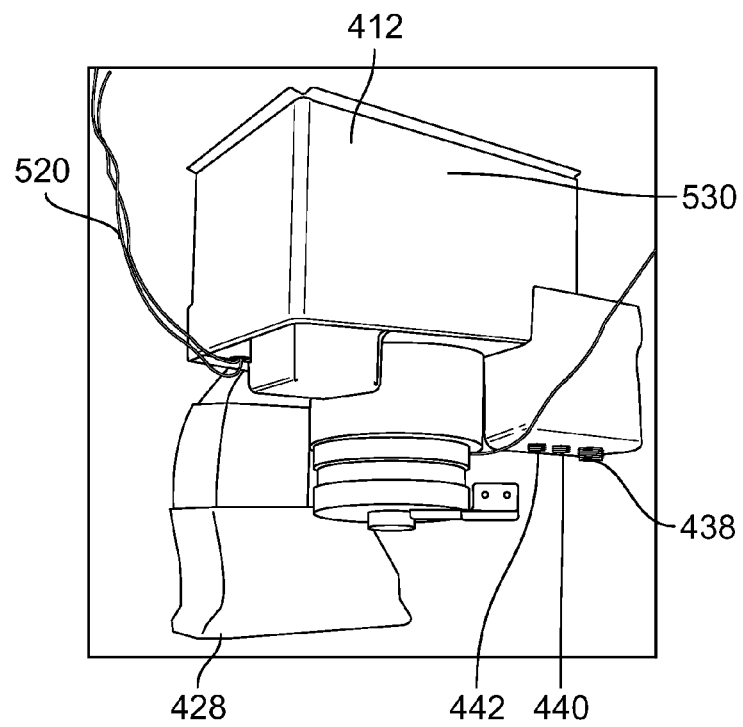
Figure 5E:
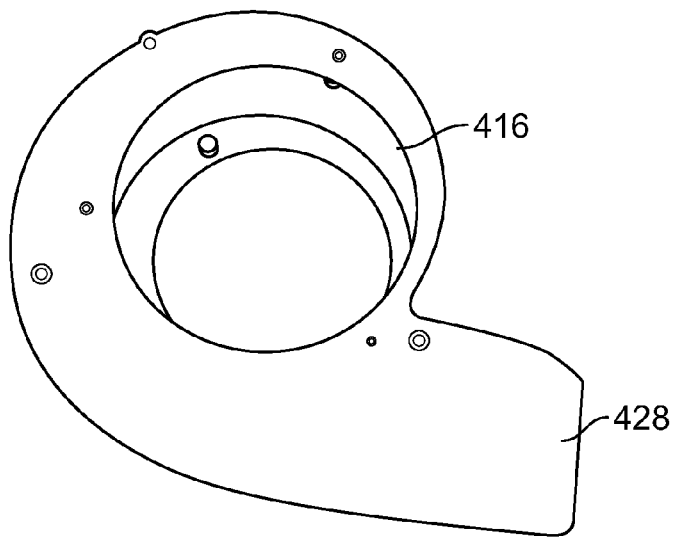
Figure 5F:
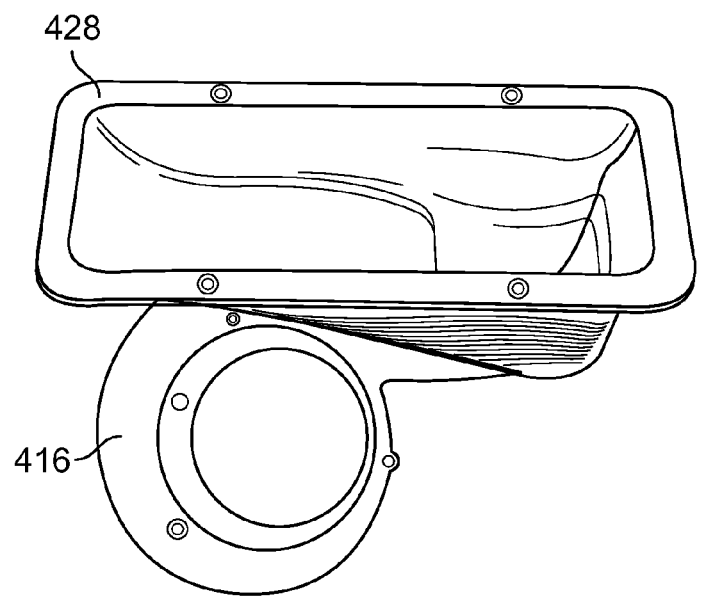
Figure 5G:
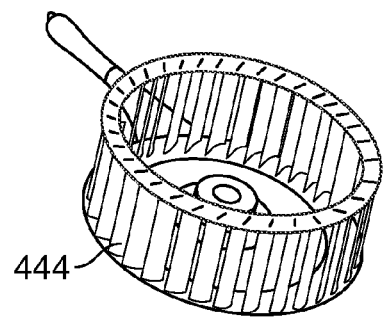

FIGS. 5A, 5B, 5C, 5D, 5E, 5F, and 5G are perspective views of an air chiller 500, illustrating the relative positions and interconnections of components thereof, according to another embodiment. The air chiller 500 may be an embodiment of the air chiller 400 and air chiller 130, and may include an embodiment of the vapor cycle refrigeration system 300. Elements of the air chiller 500 that are substantially the same as those previously described with reference to the air chiller 400 are identified using the same reference numerals. As illustrated in FIG. 5A, thermal insulation 530 is wrapped around the evaporator housing 412. Also, a refrigerant filter and dryer 510 is coupled with refrigerant tubing between the liquid-cooled condenser 426 and the expansion valve 330. The filter and dryer 510 may be an embodiment of the filter 326 of the vapor cycle refrigeration system 300. The filter and dryer 510 may be coupled on one side to the refrigerant supply connection 440. In addition, electrical wiring 520 for the fan motor for the evaporator fan 418 is illustrated being electrically coupled with the controller 424. FIGS. 5A and 5B also illustrate refrigerant tubing 540 coupling the compressor 422 with the liquid-cooled condenser 426.

The air chiller 500 may be configured in a space-saving case that fits within the air chiller mounting location 120 of FIG. 1. For example, the outer enclosure of the air chiller 400 and 500 may be approximately 8.6 inches wide by 24 inches long by 15.75 inches high. The chiller air inlet 402 may be approximately 5.5 inches by 10.6 inches, and may be disposed approximately 1.6 inches from the front enclosure panel and the back enclosure panel, and approximately 1.5 inches from the side enclosure panel 408. The chiller air outlet opening 432 may be approximately 7.1 inches by 2.2 inches, and may be disposed approximately 0.6 inches from the back enclosure panel and 1.5 inches from the side enclosure panel 408 when in an orientation parallel with the back enclosure panel.

The air chiller 500 may include an electrical connection for the controller 424 that includes pins for phase A (1), phase B (2), and phase C (3) of a 115/200 VAC three phase 400 Hz power supply, according to an embodiment. These may be provided as pins 1-3 in a 10 pin connector, for example. In other embodiments, different voltage and frequency values may be supported by the electrical connection. The electrical connection may also include an electrical connection for a fault signal (e.g., pin 4), which may be active when the signal on the fault connection pin is low. The fault signal may be low when connected to ground, for example. In normal non-fault operation, the fault signal electrical connection may be electrically connected with another electrical connection pin (e.g., pin 10) to form a closed loop. Another electrical connection pin (e.g., pin 5) may provide +28 VDC, while another electrical connection pin (e.g., pin 6) may provide a 28 VDC return. These 28 VCD electrical connections (e.g., pins 5 and 6) may provide chiller on/off control. Another electrical connection (e.g., pin 9) may provide chassis ground. Other electrical connections (e.g., pins 7 and 8) on an electrical connector (e.g., a 10 pin electrical connector) may be unused, or may be reserved for other future uses not described herein.

Table 1 below illustrates performance parameters of the air chiller 130 including the vapor cycle refrigeration system 300, according to an embodiment. In the table, CAX airflow ranges from 110 to 150 l/s.

TABLE 1

Performance Parameters

| | | IP Unit | | | | |
|---|---|---|---|---|---|---|
| CAX Air flow | CFM | 233.1 | 254.3 | 275.5 | 296.6 | 317.8 |
| Air-Cooling Processes | | | | | | |
| Ambient Temperature | °F. | 85 | 85 | 85 | 85 | 85 |
| Chiller return air temperature | °F. | 39.2 | 39.2 | 39.2 | 39.2 | 39.2 |
| Chiller supply air temperature | °F. | 28.9 | 28.4 | 28 | 27.7 | 27.4 |
| Moisture content | % | 53 | 52 | 51 | 50 | 49 |
| Evaporator air flow | CFM | 310 | 310 | 310 | 310 | 310 |
| Evaporator fan pressure rise | InH20 | 2.5 | 2.5 | 2.5 | 2.5 | 2.5 |
| Fan efficiency | % | 40 | 40 | 40 | 40 | 40 |
| Cooling capacity of chiller | Btu/h | 3683 | 3858 | 4008 | 4136 | 4248 |
| Refrigeration System | | | | | | |
| Compressor | | 581-7 | 581-7 | 581-7 | 581-7 | 581-7 |
| Compressor displacement | Cub | 1.184 | 1.184 | 1.184 | 1.184 | 1.184 |
| Compressor speed | RPM | 4560 | 4560 | 4560 | 4560 | 4560 |
| Compressor adiabatic | % | 70 | 70 | 70 | 70 | 70 |
| Compressor motor Efficiency | % | 45 | 45 | 45 | 45 | 45 |
| Compressor volumetric | % | 69.7 | 71.7 | 72.3 | 73.2 | 74.1 |
| Refrigerant flow rate | lb/min | 1.56 | 1.57 | 1.57 | 1.58 | 1.58 |
| Evaporating pressure | Psia | 35.6 | 35.1 | 34.6 | 34.2 | 33.8 |
| Evaporating temperature | °F. | 23.4 | 22.6 | 22 | 21.5 | 21 |
| Effectiveness of the evaporator | % | 65 | 65 | 65 | 65 | 65 |
| Cooling capacity | Btu/h | 4459 | 4635 | 4784 | 4913 | 5025 |
| Condensing pressure | Psia | 277.1 | 261 | 247.7 | 236.4 | 226.9 |
| Condensing temperature | °F. | 149.9 | 145.2 | 141.2 | 137.7 | 134.5 |
| Effectiveness of the condenser | % | 85 | 85 | 85 | 85 | 85 |
| Cond refrigerant inlet | °F. | 327.2 | 320.8 | 315.2 | 310.1 | 305.6 |
| Cond refrigerant outlet | °F. | 140 | 135.2 | 131.2 | 127.7 | 124.5 |
| Condenser heat rejection | Btu/h | 10392 | 10470 | 10529 | 10574 | 10608 |
| PGW Sysem (Propylene Glycol Water, 50-50%) | | | | | | |
| Cond liquid inlet temperature | °F. | 123.9 | 119.1 | 114.9 | 111.2 | 108 |
| Cond liquid outlet temperature | °F. | 146 | 141.3 | 137.2 | 133.7 | 130.6 |
| Liquid flow rate | GPM | 1.057 | 1.057 | 1.057 | 1.057 | 1.057 |
| Liquid flow rate | lb/min | 8.97 | 8.99 | 9 | 9.01 | 9.03 |
| Liquid pressure rise | Psid | 50 | 50 | 50 | 50 | 50 |
| Pump efficiency | % | 45 | 45 | 45 | 45 | 45 |
| CAX Air Cooling System | | | | | | |
| HX air return air temperature | °F. | 128 | 124.7 | 121.8 | 119.3 | 117.2 |
| HX Air supply air temperature | °F. | 85 | 85 | 85 | 85 | 85 |

TABLE 1-continued

| Performance Parameters | | | | | | |
|---|---|---|---|---|---|---|
| CAX air flow | CFM | 233.1 | 254.3 | 275.5 | 296.6 | 317.8 |
| Effectiveness of heat exchanger | % | 70 | 70 | 70 | 70 | 70 |
| Power and COP | | | | | | |
| Evaporator fan | w | 227.5 | 227.5 | 227.5 | 227.5 | 227.5 |
| Compressor | w | 1684 | 1657 | 1630 | 1606 | 1583 |
| Liquid pump | w | 52 | 52 | 52 | 52 | 52 |
| Electronic Box | w | 50 | 50 | 50 | 50 | 50 |
| Total Power Consumption | w | 2013.5 | 1986.5 | 1959.5 | 1935.5 | 1912.5 |
| COP | | 0.54 | 0.57 | 0.60 | 0.63 | 0.65 |

| SI Unit | | | | | | |
|---|---|---|---|---|---|---|
| CAX Air flow | Liter/Sec | 110.0 | 120.0 | 130.0 | 140.0 | 150.0 |
| Air-Cooling Processes | | | | | | |
| Ambient Temperature | °C. | 29.4 | 29.4 | 29.4 | 29.4 | 29.4 |
| Chiller return air temperature | °C. | 4.0 | 4.0 | 4.0 | 4.0 | 4.0 |
| Chiller supply air temperature | °C. | −1.7 | −2.0 | −2.2 | −2.4 | −2.6 |
| Moisture content | % | 53.0 | 52.0 | 51.0 | 50.0 | 49.0 |
| Evaporator air flow | Liter/Sec | 146.3 | 146.3 | 146.3 | 146.3 | 146.3 |
| Evaporator fan pressure rise | mbar | 6.2 | 6.2 | 6.2 | 6.2 | 6.2 |
| Fan efficiency | % | 40.0 | 40.0 | 40.0 | 40.0 | 40.0 |
| Cooling capacity of chiller | w | 1078.7 | 1129.9 | 1173.8 | 1211.3 | 1244.1 |
| Refrigeration System | | | | | | |
| Compressor | | 581-7 | 581-7 | 581-7 | 581-7 | 581-7 |
| Compressor displacement | Cub | 19.402 | 19.402 | 19.402 | 19.402 | 19.402 |
| Compressor speed | RPM | 4560 | 4560 | 4560 | 4560 | 4560 |
| Compressor adiabatic | % | 70 | 70 | 70 | 70 | 70 |
| Compressor motor Efficiency | % | 45 | 45 | 45 | 45 | 45 |
| Compressor volumetric | % | 69.7 | 71.7 | 72.3 | 73.2 | 74.1 |
| Refrigerant flow rate | kg/min | 0.71 | 0.71 | 0.71 | 0.72 | 0.72 |
| Evaporating pressure | Bar | 2.5 | 2.4 | 2.4 | 2.4 | 2.3 |
| Evaporating temperature | °C. | −4.8 | −5.2 | −5.6 | −5.8 | −6.1 |
| Effectiveness of the evaporator | % | 65 | 65 | 65 | 65 | 65 |
| Cooling capacity | w | 1305.9 | 1357.5 | 1401.1 | 1438.9 | 1471.7 |
| Condensing pressure | Bar | 19.1 | 18.0 | 17.1 | 16.3 | 15.6 |
| Condensing temperature | °C. | 65.5 | 62.9 | 60.7 | 58.7 | 56.9 |
| Effectiveness of the condenser | % | 85 | 85 | 85 | 85 | 85 |
| Cond refrigerant inlet | °C. | 164.0 | 160.4 | 157.3 | 154.5 | 152.0 |
| Cond refrigerant outlet | °C. | 60.0 | 57.3 | 55.1 | 53.2 | 51.4 |
| Condenser heat rejection | w | 3043.6 | 3066.4 | 3083.7 | 3096.9 | 3106.8 |
| PGW Sysem (Propylene Glycol Water, 50-50%) | | | | | | |
| Cond liquid inlet temperature | °C. | 51.1 | 48.4 | 46.1 | 44.0 | 42.2 |
| Cond liquid outlet temperature | °C. | 63.3 | 60.7 | 58.4 | 56.5 | 54.8 |
| Liquid flow rate | Liter/min | 4.0 | 4.0 | 4.0 | 4.0 | 4.0 |
| Liquid flow rate | kg/min | 4.1 | 4.1 | 4.1 | 4.1 | 4.1 |
| Liquid pressure rise | Bar | 3.4 | 3.4 | 3.4 | 3.4 | 3.4 |
| Pump efficiency | % | 45.0 | 45.0 | 45.0 | 45.0 | 45.0 |
| CAX Air Cooling System | | | | | | |
| HX air return air temperature | °C. | 53.3 | 51.5 | 49.9 | 48.5 | 47.3 |
| HX Air supply air temperature | °C. | 29.4 | 29.4 | 29.4 | 29.4 | 29.4 |
| CAX air flow | Liter/Sec | 110.0 | 120.0 | 130.0 | 140.0 | 150.0 |
| Effectiveness of heat exchanger | % | 70 | 70 | 70 | 70 | 70 |
| Power and COP | | | | | | |
| Evaporator fan | w | 227.5 | 227.5 | 227.5 | 227.5 | 227.5 |
| Compressor | w | 1684 | 1657 | 1630 | 1606 | 1583 |
| Liquid pump | w | 52 | 52 | 52 | 52 | 52 |
| Electronic Box | w | 50 | 50 | 50 | 50 | 50 |
| Total Power Consumption | w | 2013.5 | 1986.5 | 1959.5 | 1935.5 | 1912.5 |
| COP | | 0.54 | 0.57 | 0.60 | 0.63 | 0.65 |

Figure 6:
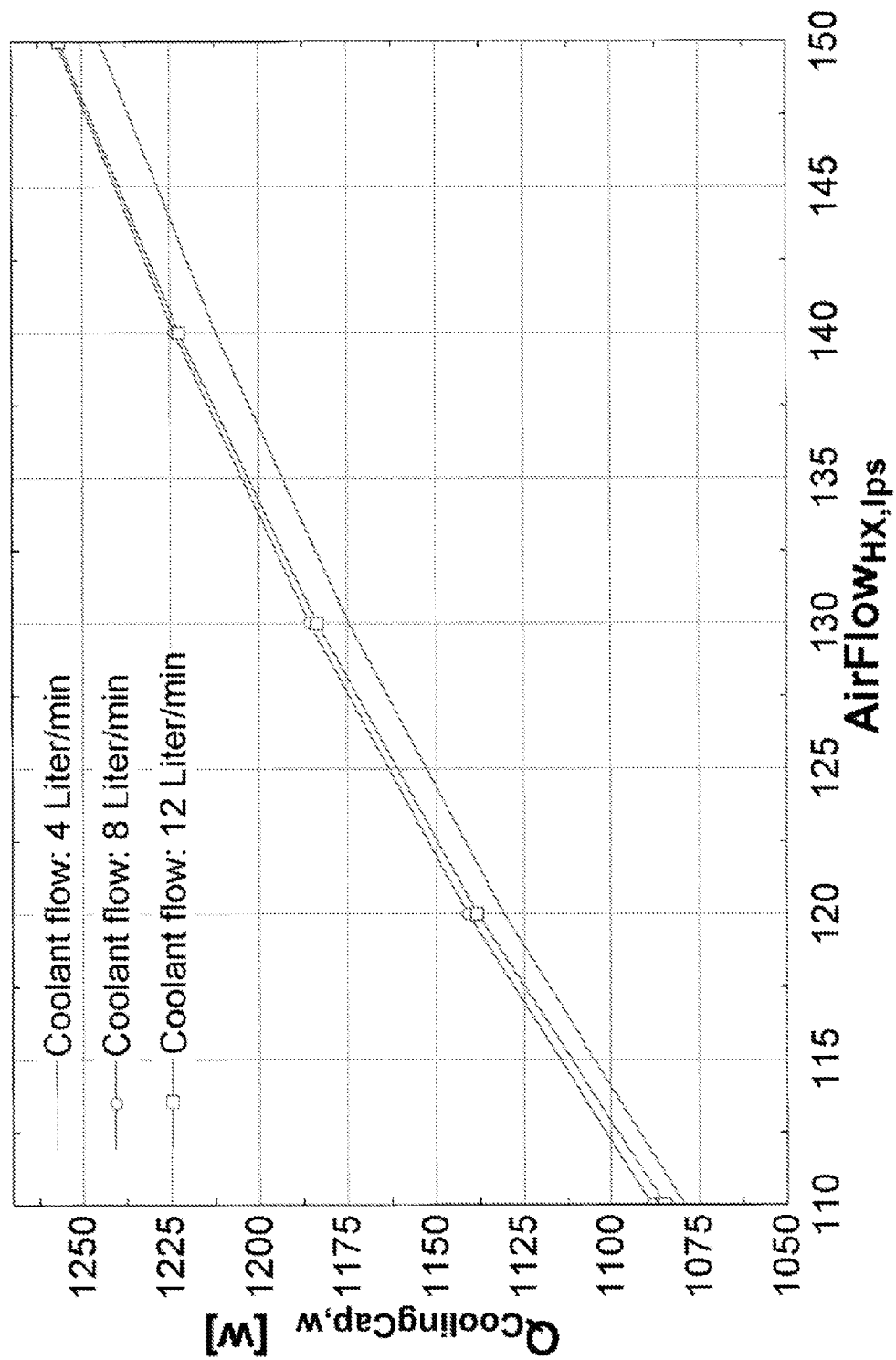
FIG. 6 is a graph illustrating the cooling capacity of an air chiller vs. coolant flow, according to an embodiment.
Figure 7:
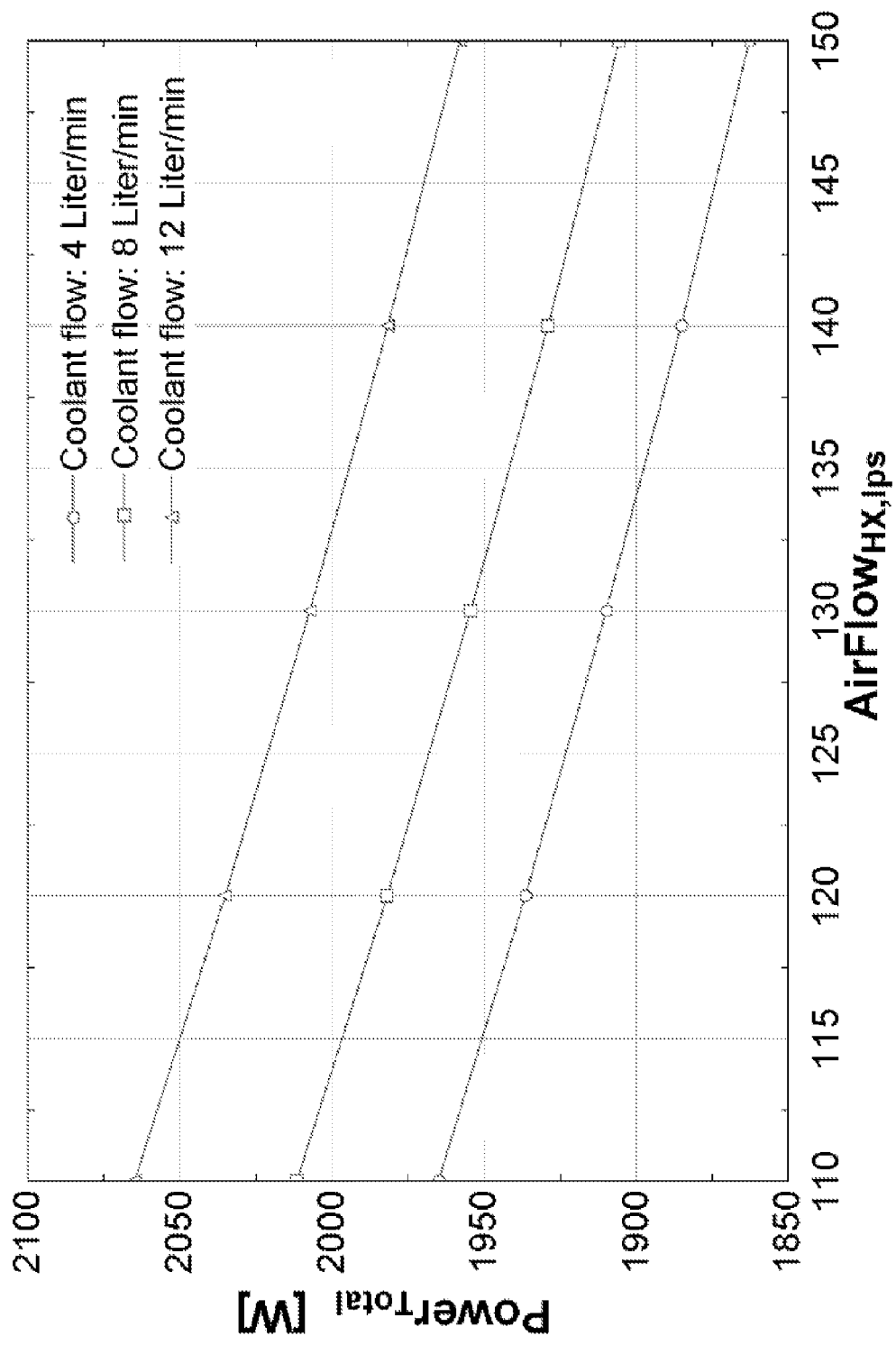
FIG. 7 is a graph illustrating the power consumption of an air chiller vs. coolant flow, according to an embodiment.
Figure 8:
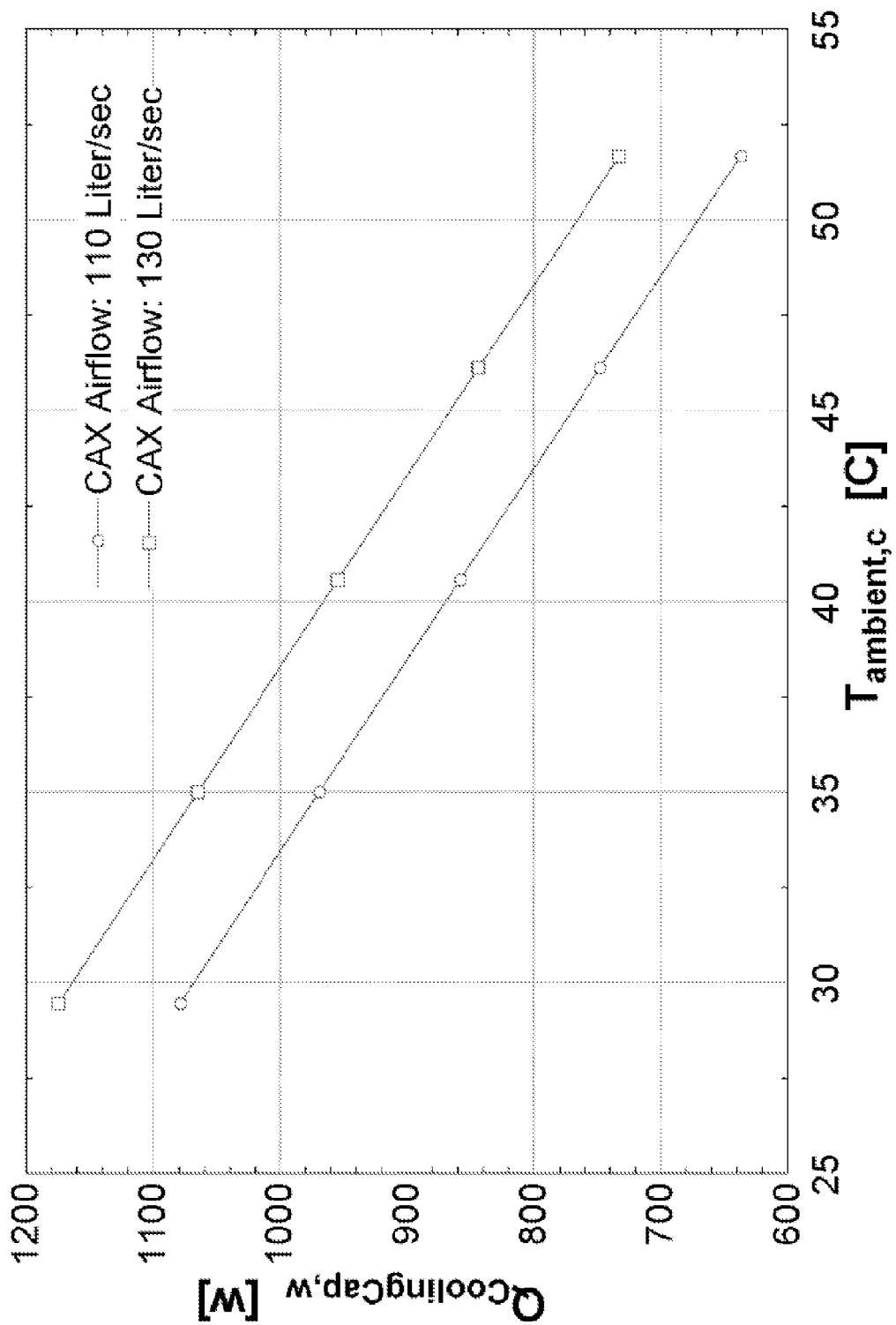
FIG. 8 is a graph illustrating the cooling capacity of an air chiller vs. CAX air flow and temperature, according to an embodiment.

FIG. 6 is a graph illustrating the cooling capacity of an air chiller vs. coolant flow, according to an embodiment. FIG. 7 is a graph illustrating the power consumption of an air chiller vs. coolant flow, according to an embodiment. FIG. 8 is a graph illustrating the cooling capacity of an air chiller vs. CAX air flow and temperature, according to an embodiment. These graphs illustrate performance properties of embodiments of the air chillers 130, 400, and 500.

Figure 9:
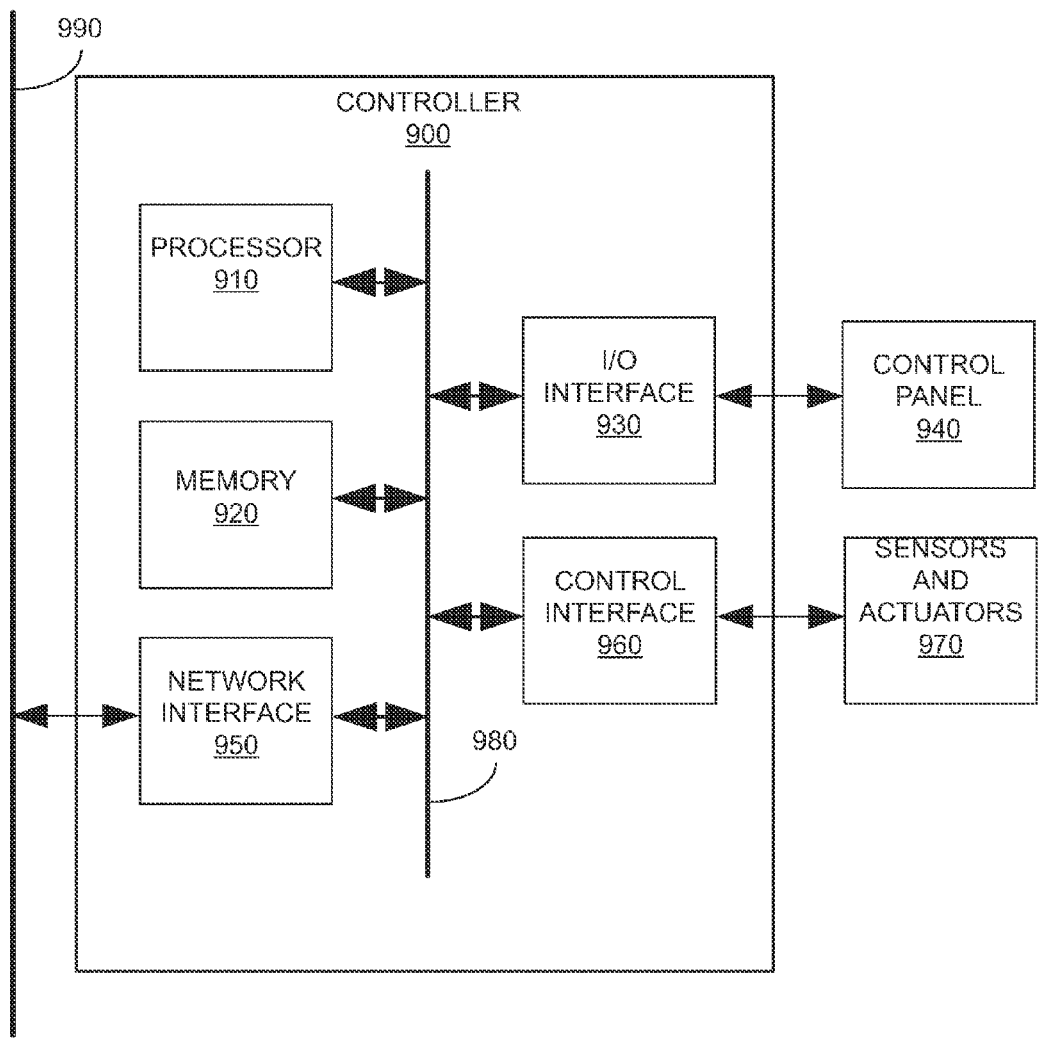
FIG. 9 is a block diagram of a controller for an air chiller or vapor cycle refrigeration system, according to an embodiment.

FIG. 9 is a block diagram of a controller 900 for an air chiller 130, 400, or 500, or vapor cycle refrigeration system 300, according to an embodiment. The controller 900 may be an embodiment of the controller 424, or may be coupled with the vapor cycle refrigeration system 300. The controller 900 may be coupled with a control panel 940 via an I/O interface 930. The controller 900 may receive input commands from a user via input devices, such as turning the refrigeration system on or off, selecting an operation mode, and setting a desired temperature. The controller 900 may output information to the user regarding an operational status (e.g., operational mode, activation of a defrost cycle, shut-off due to over-temperature conditions of a refrigerated compartment and/or components of the vapor cycle refrigeration system 300, etc.) of the refrigeration system using a display panel. The controller 900 may be coupled with the input devices and the display panel using shielded and twisted cables, and may communicate with the input devices and/or the display panel using an RS-232 communication protocol due to its electrically robust characteristics. Similar display panels and input devices may also be present in embodiments of refrigeration equipment, air chillers, and refrigerators with which the controller 900 may be coupled. Alternatively, similar display panels and input devices may be installed remotely from embodiments of the refrigeration equipment, air chillers, and refrigerators with which the controller 900 may be coupled.

The controller 900 may include a processor 910 that performs computations according to program instructions, a memory 920 that stores the computing instructions and other data used or generated by the processor 910, and a network interface 950 that includes data communications circuitry for interfacing to a data communications network 990 such as Ethernet, Galley Data Bus (GAN), or Controller Area Network (CAN). The processor 910 may include a microprocessor, a Field Programmable Gate Array, an Application Specific Integrated Circuit, or a custom Very Large Scale Integrated circuit chip, or other electronic circuitry that performs a control function. The processor 910 may also include a state machine. The controller 900 may also include one or more electronic circuits and printed circuit boards. The processor 910, memory 920, and network interface 950 may be coupled with one another using one or more data buses 980. The controller 900 may communicate with and control various sensors and actuators 970 of the vapor cycle refrigeration system 300 via a control interface 960.

The controller 900 may be controlled by or communicate with a centralized computing system, such as one onboard an aircraft. The controller 900 may implement a compliant ARINC 812 logical communication interface on a compliant ARINC 810 physical interface. The controller 900 may communicate via the Galley Data Bus (e.g., galley networked GAN bus), and exchange data with a Galley Network Controller (e.g., Master GAIN Control Unit as described in the ARINC 812 specification). In accordance with the ARINC 812 specification, the controller 900 may provide network monitoring, power control, remote operation, failure monitoring, and data transfer functions. The controller 900 may implement menu definitions requests received from the Galley Network Controller (GNC) for presentation on a GNC Touchpanel display device and process associated button push events to respond appropriately. The controller 900 may provide additional communications using an RS-232 communications interface and/or an infrared data port, such as communications with a personal computer (PC) or a personal digital assistant (PDA). Such additional communications may include real-time monitoring of operations of the vapor cycle refrigeration system 300, long-term data retrieval, and control system software upgrades. In addition, the control interface 960 may include a serial peripheral interface (SPI) bus that may be used to communicate between the controller 900 and motor controllers within the vapor cycle refrigeration system 300.

The vapor cycle refrigeration system 300 may be configured to refrigerate beverages and/or food products which are placed in a chilled or refrigerated compartment with which the vapor cycle refrigeration system 300 is operatively attached. The vapor cycle refrigeration system 300 may operate in one or more of several modes, including refrigeration, beverage chilling, and freezing. A user may select a desired temperature for a refrigerated compartment using the control panel 940. The controller 900 included with the vapor cycle refrigeration system 300 may control a temperature within the refrigerated compartment at a high level of precision according to the desired temperature. Therefore, quality of food stored within the refrigerated compartment may be maintained according to the user-selected operational mode of the vapor cycle refrigeration system 300.

In various embodiments, the vapor cycle refrigeration system 300 may maintain a temperature inside the refrigerated compartment according to a user-selectable option among several preprogrammed temperatures, or according to a specific user-input temperature. For example, a beverage chiller mode may maintain the temperature inside the refrigerated compartment at a user-selectable temperature of approximately 9° C., 12° C., or 16° C. In a refrigerator mode, the temperature inside the refrigerated compartment may be maintained at a user-selectable temperature of approximately 4° C. or 7° C. In a freezer mode, the temperature inside the refrigerated compartment may be maintained at a user-selectable temperature of approximately −18° C. to 0° C.

The controller 900 may poll sensors at a fixed minimum rate such that all data required to control the performance of the vapor cycle refrigeration system 300 may be obtained by the controller 900 in time for real-time operation of the one or more cooling systems within the vapor cycle refrigeration system 300. The polled values may be reported by the controller 900 via the RS-232 or infrared interface to a personal computer or PDA and may be reported over a controller area network (CAN) bus. The polled values may also be used in control algorithms by the controller 900, and may be stored to long-term memory or a data storage medium for later retrieval and analysis.

The controller 900 may provide a self-protection scheme to protect against damage to the vapor cycle refrigeration system 300 and its constituent components due to abnormal external and/or internal events such as over-temperature conditions, over-pressure conditions, over-current conditions, etc. and shut down the vapor cycle refrigeration system 300 and/or one or more of its constituent components in accordance with the abnormal event. The self-protection scheme may include monitoring critical system sensors and taking appropriate self-protection action when monitored data from the sensors indicate a problem requiring activation of a self-protection action. Such a self-protection action may prevent the vapor cycle refrigeration system 300 and/or its constituent components from being damaged or causing an unsafe condition. The self-protection action may also provide appropriate notification via a display panel regarding the monitored problem, the self-protection action, and/or any associated maintenance required. The controller's self-protection scheme may supplement, rather than replace, mechanical protection devices which may also be deployed within the vapor cycle refrigeration system 300. The controller 900 may use monitored data from the sensors to intelligently restart the vapor cycle refrigeration system 300 and reactivate the desired operational mode after the abnormal event which triggered the self-protection shut-down has terminated or reduced in severity.

The vapor cycle refrigeration system 300 may be controlled by an electronic control system associated with the controller 900. The memory 920 of the controller 900 may store a program for performing a method of controlling the vapor cycle refrigeration system 300 executable by the processor 910. The method of controlling the vapor cycle refrigeration system 300 performed by the electronic control system may include a feedback control system such that the vapor cycle refrigeration system 300 may automatically maintain a prescribed temperature in a food and beverage storage compartment with which the vapor cycle refrigeration system 300 is coupled.

The aircraft galley air chiller 130 may be a line replaceable unit (LRU), and may provide refrigeration functionality while the aircraft is both on the ground and in flight. The refrigeration may be provided using a cooling system as herein. The air chiller 130 may be designed according to an ARINC 810 standard. The air chiller 130 may be configured to operate using an electrical power source such as three phase 115 or 200 volts frequency alternating current (AC) at a frequency of 360 to 900 Hz. The vapor cycle refrigeration system 300 may employ AC to DC power conversion to provide a predictable and consistent power source to motors and/or valve actuators. The air chiller 130 may also include a polyphase transformer (e.g., a 15-pulse transformer) to reduce current harmonics reflected from the air chiller 130 back into an airframe power distribution system with which the air chiller 130 may be coupled.

Figure 10:
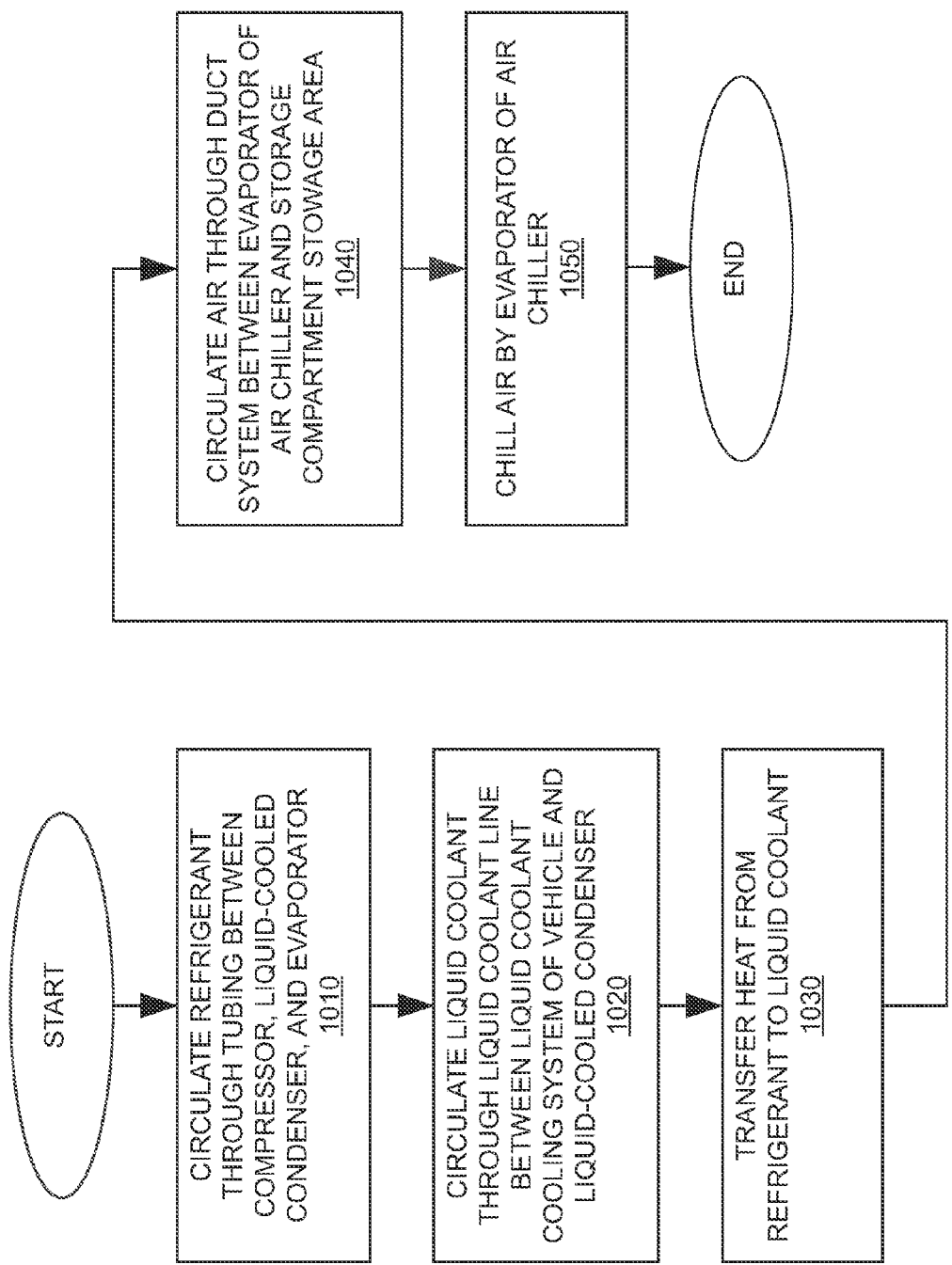
FIG. 10 is a flow chart of a method of operating vehicle refrigeration equipment having a liquid heat rejection system, according to an embodiment.

FIG. 10 is a flow chart of a method of operating vehicle refrigeration equipment having a liquid heat rejection system, according to an embodiment. In a step 1010, an air chiller may circulate refrigerant through tubing between a compressor, a liquid-cooled condenser, and an evaporator. In a step 1020, the refrigeration system may circulate liquid coolant through a liquid coolant line between a central liquid coolant cooling system of the vehicle and the liquid-cooled condenser of the air chiller. The central liquid coolant cooling system of the vehicle may cool the liquid coolant. For example, the central liquid coolant cooling system may cool the liquid coolant using a vapor cycle system or using cool airflow from air exterior to the vehicle. In a step 1030, heat may be transferred from the refrigerant circulating through the tubing of the air chiller to the liquid coolant circulating through the liquid coolant line. In a step 1040, air may circulate through a duct system between an evaporator of the air chiller and a storage compartment stowage area having an interior for stowing a plurality of removable storage compartments. The air chiller may be situated parallel to the storage compartment stowage area along a plane perpendicular to a direction in which the removable storage compartments are removed and replaced. The air may not circulate through any ducts behind the removable storage compartments relative to a front side of the storage compartment stowage area through which the removable storage compartments are removed and replaced. In a step 1050, the air chiller may chill air using the evaporator.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A refrigeration system for cooling removable storage compartments in a vehicle galley, comprising:
    an air chiller comprising:
        a compressor,
        a liquid-cooled condenser,
        an evaporator, and
        a tubing to circulate refrigerant through the air chiller from the compressor to the liquid-cooled condenser to the evaporator and back to the compressor;
    a liquid coolant line that circulates liquid coolant between a central liquid coolant cooling system of a vehicle that cools the liquid coolant and the liquid-cooled condenser that transfers heat from the refrigerant circulating through the tubing to the liquid coolant circulating through the liquid coolant line;
    a storage compartment stowage area having an interior for stowing a plurality of removable storage compartments, the interior defined by a front side configured for removal and replacement of the plurality of removable storage compartments, a backside, sides, and a bottom; and
    a duct system in fluid communication between the storage compartment stowage area and the air chiller, the air chiller situated to a side of and parallel to the storage compartment stowage area along a plane perpendicular to a direction in which the plurality of removable storage compartments are removed and replaced, the duct system including supply air ducting and return air ducting, the supply air ducting circulating chilled air from a chiller air outlet opening positioned beneath the evaporator to the interior of the storage compartment stowage area, the supply air ducting extending from the chiller air outlet opening to the side of the storage compartment stowage area, the return air ducting returning return air from the interior of the storage compartment stowage area through a chiller air inlet positioned above the evaporator to the evaporator, the return air ducting extending from the chiller air inlet to the side of the storage compartment stowage area, the duct system not including any ducts along the backside of the storage compartment stowage area,
    wherein the air chiller outputs the chilled air at a lower portion of the air chiller, the chilled air enters the storage compartment stowage area at a lower region of the storage compartment stowage area, the return air exits the storage compartment stowage area at an upper region of the storage compartment stowage area, and the return air enters the air chiller at an upper portion of the air chiller,
    wherein the evaporator is located adjacent to the storage compartment stowage area such that the supply air ducting routes the chilled air from the air chiller to the storage compartment stowage area and such that the return air ducting routes the return air from the storage compartment stowage area to the air chiller.

2. The refrigeration system of claim 1, wherein the air chiller operates using three phase alternating current electrical power.

3. The refrigeration system of claim 1, wherein the evaporator is disposed in the upper portion of the air chiller and the air chiller further comprises a fan that draws the chilled air downward from the evaporator and outputs the chilled air downward through the chiller air outlet opening in the lower portion of the air chiller.

* * * * *